(12) United States Patent
Yao et al.

(10) Patent No.: US 11,815,953 B2
(45) Date of Patent: Nov. 14, 2023

(54) AUXILIARY MONITOR SYSTEM

(71) Applicant: MOBILE PIXELS INC., Irwindale, CA (US)

(72) Inventors: Xiaoliang Yao, Burlington, MA (US); Wenglong Ng, Burlington, MA (US); Richard Miller, Needham, MA (US); Brian Yoo, Arlington, MA (US); Evan Hunter Williams, Cambridge, MA (US)

(73) Assignee: MOBILE PIXELS INC., Irwindale, CA (US)

( * ) Notice: Subject to any disclaimer, the term of this patent is extended or adjusted under 35 U.S.C. 154(b) by 142 days.

(21) Appl. No.: 16/850,654

(22) Filed: Apr. 16, 2020

(65) Prior Publication Data
US 2020/0333843 A1 Oct. 22, 2020

Related U.S. Application Data

(60) Provisional application No. 62/835,399, filed on Apr. 17, 2019.

(51) Int. Cl.
*G06F 1/16* (2006.01)

(52) U.S. Cl.
CPC .......... *G06F 1/1649* (2013.01); *G06F 1/1622* (2013.01); *G06F 1/1624* (2013.01); *G06F 1/1681* (2013.01)

(58) Field of Classification Search
CPC .... G06F 1/1649; G06F 1/1622; G06F 1/1624; G06F 1/1681; G06F 2200/1613; G06F 1/1637; G06F 1/1647; G06F 1/1607
See application file for complete search history.

(56) References Cited

U.S. PATENT DOCUMENTS

| | | | |
|---|---|---|---|
| 6,532,146 B1 | 3/2003 | Duquette | |
| 6,667,877 B2 | 12/2003 | Duquette | |
| 7,283,353 B1* | 10/2007 | Jordan | H04N 5/64 345/1.3 |
| 7,660,914 B2 | 2/2010 | Perez et al. | |
| 8,018,715 B2 | 9/2011 | Chang | |
| 2005/0243021 A1 | 11/2005 | Perez et al. | |
| 2005/0253775 A1* | 11/2005 | Stewart | G06F 1/1616 345/1.1 |
| 2006/0082518 A1* | 4/2006 | Ram | G06F 1/1635 345/1.1 |
| 2009/0201222 A1* | 8/2009 | Damian | G06F 1/1615 345/1.1 |

(Continued)

FOREIGN PATENT DOCUMENTS

| | | |
|---|---|---|
| CN | 103064464 B | 8/2015 |
| WO | 02063449 A2 | 8/2002 |

OTHER PUBLICATIONS

International Search Report and Written Opinion of International Patent Application No. PCT/US2020/028650 dated Aug. 18, 2020.

*Primary Examiner* — Stephen G Sherman
(74) *Attorney, Agent, or Firm* — Lando & Anastasi, LLP

(57) ABSTRACT

According to an aspect of the disclosure, an auxiliary monitor system is provided. The auxiliary monitor system includes a first auxiliary monitor configured to be coupled to a primary monitor, a second auxiliary monitor, and at least one fastener configured to removably couple the first auxiliary monitor to the second auxiliary monitor.

20 Claims, 24 Drawing Sheets

(56) References Cited

U.S. PATENT DOCUMENTS

| | | | |
|---|---|---|---|
| 2010/0060587 A1* | 3/2010 | Freund | H04M 1/0247 |
| | | | 345/169 |
| 2012/0274570 A1* | 11/2012 | Kim | G06F 1/1647 |
| | | | 361/810 |
| 2013/0277271 A1 | 10/2013 | Toulotte | |
| 2016/0154434 A1* | 6/2016 | Lakhani | G06F 1/1628 |
| | | | 361/679.27 |
| 2018/0033992 A1* | 2/2018 | Seo | H01L 51/5072 |
| 2019/0332146 A1 | 10/2019 | Yao et al. | |
| 2020/0015370 A1* | 1/2020 | Kim | E05D 5/02 |
| 2021/0165445 A1* | 6/2021 | Durant | G06F 3/1446 |

* cited by examiner

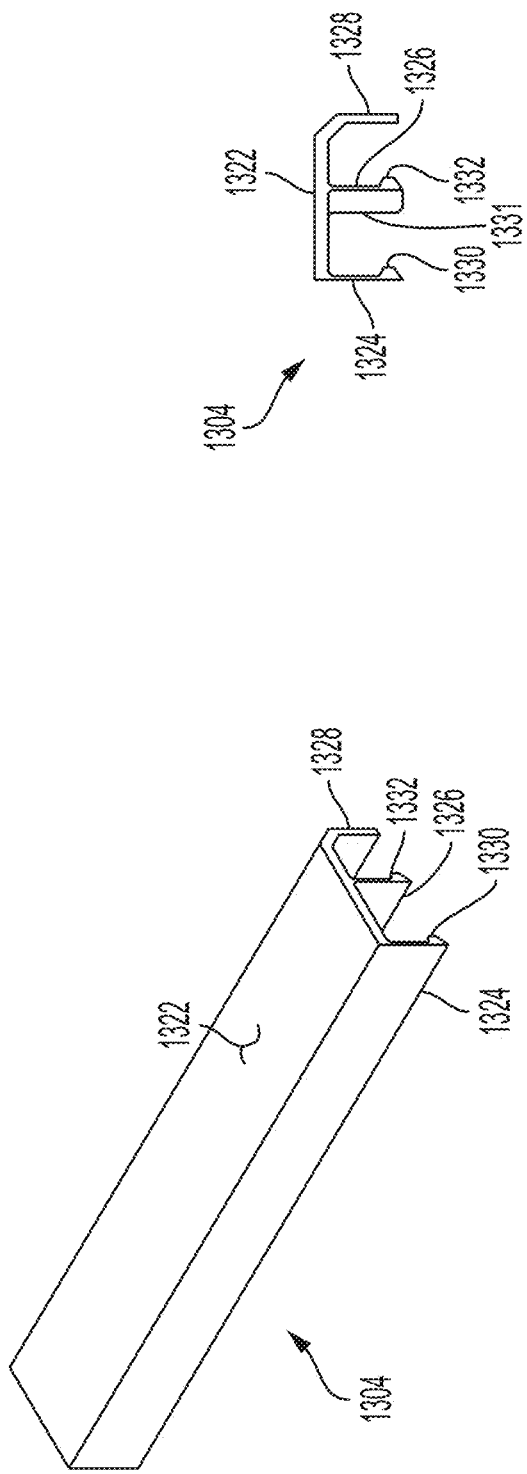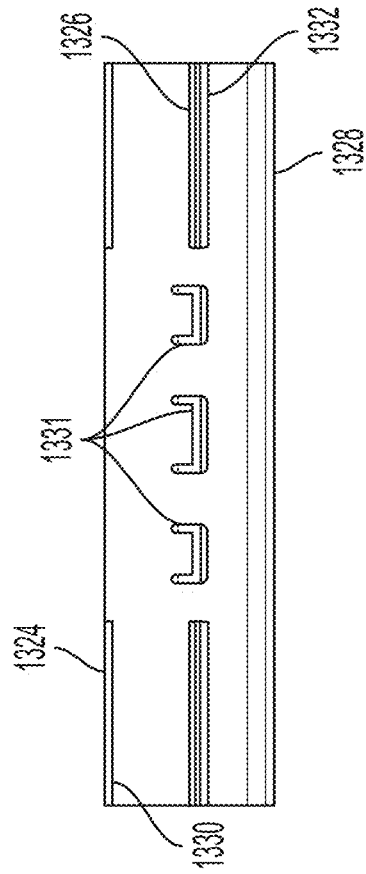
FIG. 16A
FIG. 16B
FIG. 16C

AUXILIARY MONITOR SYSTEM

CROSS-REFERENCE TO RELATED APPLICATION

This application claims priority under 35 U.S.C. § 119(e) to U.S. Provisional Application Ser. No. 62/835,399, titled "AUXILIARY MONITOR SYSTEM," filed on Apr. 17, 2019, which is hereby incorporated by reference in its entirety.

FIELD OF TECHNOLOGY

The disclosure relates to computer monitors in general, and more particularly, to auxiliary laptop monitors.

SUMMARY

Aspects and embodiments disclosed herein relate to an auxiliary monitor system including a first auxiliary monitor configured to be coupled to a primary monitor, a second auxiliary monitor, and at least one fastener configured to removably couple the first auxiliary monitor to the second auxiliary monitor.

In at least one example, the first auxiliary monitor includes a first mount having at least one first rail and includes a first display portion having at least one first hinge configured to be slidably coupled to the at least one first rail and enabling the first display portion to rotate relative to the first mount, and the second auxiliary monitor includes a second mount having at least one second rail and includes a second display portion having at least one second hinge configured to be slidably coupled to the at least one second rail and enabling the second display portion to rotate relative to the second mount. In some examples, the first mount further includes a first groove configured to be removably coupled to the at least one fastener, and the second mount further includes a second groove configured to be removably coupled to the at least one fastener. In various examples, the at least one fastener includes a backing coupled to a first protrusion, a second protrusion, and a third protrusion, and a first space between the first protrusion and the second protrusion receives the first auxiliary monitor and a second space between the second protrusion and the third protrusion receives the second auxiliary monitor.

In at least one example, the first protrusion includes a first ridge configured to be coupled to the first groove and the second protrusion includes a second ridge configured to be coupled to the second groove. In some examples, the at least one fastener includes at least one spacer coupled to the backing, the at least one spacer being configured to increase a distance between the first auxiliary monitor and the second auxiliary monitor. In various examples, the at least one spacer extends from the second protrusion to one of the first protrusion and the third protrusion, and is configured to be coupled to one of the first auxiliary monitor and the second auxiliary monitor, respectively. In at least one example, the first mount further includes a third groove configured to be removably coupled to the at least one fastener, and the second mount further includes a fourth groove configured to be removably coupled to the at least one fastener.

In some examples, the at least one fastener includes a first fastener and a second fastener, and the first fastener includes a first backing coupled to a first protrusion, a second protrusion, and a third protrusion, and a first space between the first protrusion and the second protrusion receives the first auxiliary monitor and a second space between the second protrusion and the third protrusion receives the second auxiliary monitor, and the second fastener includes a second backing coupled to a fourth protrusion, a fifth protrusion, and a sixth protrusion, and a third space between the fourth protrusion and the fifth protrusion receives the first auxiliary monitor and a fourth space between the fifth protrusion and the sixth protrusion receives the second auxiliary monitor.

In various examples, the first protrusion includes a first ridge configured to be coupled to the first groove, the second protrusion includes a second ridge configured to be coupled to the second groove, the fourth protrusion includes a third ridge configured to be coupled to the third groove, and the fifth protrusion includes a fourth ridge configured to be coupled to the fourth groove. In at least one example, the third groove is longer than the first groove, and the fourth groove is longer than the second groove. In some examples, a length of the first ridge is equal to a length of the second ridge, a length of the third ridge, and a length of the fourth ridge. In various examples, a length of the third groove is equal to a length of the fourth groove, and a length of the first groove is equal to a length of the second groove.

According to an example, an auxiliary display system is provided comprising a first auxiliary monitor configured to be coupled to a primary monitor, a second auxiliary monitor, and means for removably coupling the first auxiliary monitor to the second auxiliary monitor.

In at least one example, the system further comprises means for coupling the first auxiliary monitor to the second auxiliary monitor in a first configuration, and for reversibly coupling the first auxiliary monitor to the second auxiliary monitor is a second configuration, the first auxiliary monitor and the second auxiliary monitor each have a first orientation in the first configuration and a second orientation in the second configuration, and the first orientation of one of the first auxiliary monitor and the second auxiliary monitor is rotated by 180 degrees from the second orientation of the one of the first auxiliary monitor and the second auxiliary monitor.

According to an example, a fastener is provided comprising a backing, a plurality of protrusions extending from the backing, and a plurality of ridges each extending from a respective one of the plurality of protrusions and being configured to be removably coupled to a respective groove.

In at least one example, the plurality of protrusions includes a first protrusion, a second protrusion, and a third protrusion, and a first space between the first protrusion and the second protrusion is configured to receive a first auxiliary monitor and a second space between the second protrusion and the third protrusion is configured to receive a second auxiliary monitor. In some examples, the plurality of ridges includes a first ridge and a second ridge, the first ridge extending from the first protrusion and being configured to be coupled to a first groove of the first auxiliary monitor, and the second ridge extending from the second protrusion and being configured to be coupled to a second groove of the second auxiliary monitor. In various examples, the fastener includes at least one spacer coupled to the backing, the at least one spacer being configured to increase a distance between the first auxiliary monitor and the second auxiliary monitor. In some examples, the at least one spacer extends from the second protrusion to one of the first protrusion and the third protrusion, and is configured to be coupled to one of the first auxiliary monitor and the second auxiliary monitor, respectively.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 16A illustrates a perspective view of a fastener according to an embodiment;

FIG. 16B illustrates a side view of the fastener according to an embodiment;

FIG. 16C illustrates a bottom view of the fastener according to an embodiment.

DETAILED DESCRIPTION

Conventional laptop computers generally include a display screen to provide output information to a user, the size of which is determined at least partially for the purpose of optimizing user enjoyment. For example, although many users value laptop computers for their compactness and portability, which may require a reduction in display screen size, users also value display screens which are sufficiently large for the user to comfortably view displayed information. Accordingly, there is an inherent tension in selecting a display screen size for laptop computers having a single screen.

Design tensions associated with the implementation of a single screen may be circumvented with the addition of a second auxiliary screen communicatively coupled to the laptop computer. For example, a second auxiliary screen may be removably coupled to a backplane of a primary laptop screen. In use, a user may slide out or otherwise extend the auxiliary screen from a closed state and position the auxiliary screen in a desired orientation.

Adding a second auxiliary screen coupled to the backplane of the primary laptop screen avoids many of the design tradeoffs associated with increasing the size of a single screen. Modern laptop computer display screens are typically significantly larger in screen area than in screen thickness. Accordingly, whereas increasing the area of a single display screen yields a proportional increase in the amount of information conveyed by the display screen, adding a second auxiliary screen affixed to the backplane of the primary display screen provides approximately twice as much information at the cost of a relatively small increase in thickness. The addition of a second auxiliary screen therefore yields a significant increase in information density (i.e., the amount of information conveyed relative to the physical footprint of the laptop computer) compared to increasing the size of a single primary laptop screen.

Furthermore, in some embodiments, the user may position the auxiliary screen such that the display screen is antiparallel to the primary display screen and parallel to the backplane of the display screen. In this configuration, the auxiliary screen may be configured to function similar to a tablet computer which is capable of displaying output information and capable of receiving input information including inputs from a user's touch, inputs from a stylus, and so forth.

Figure 1A:
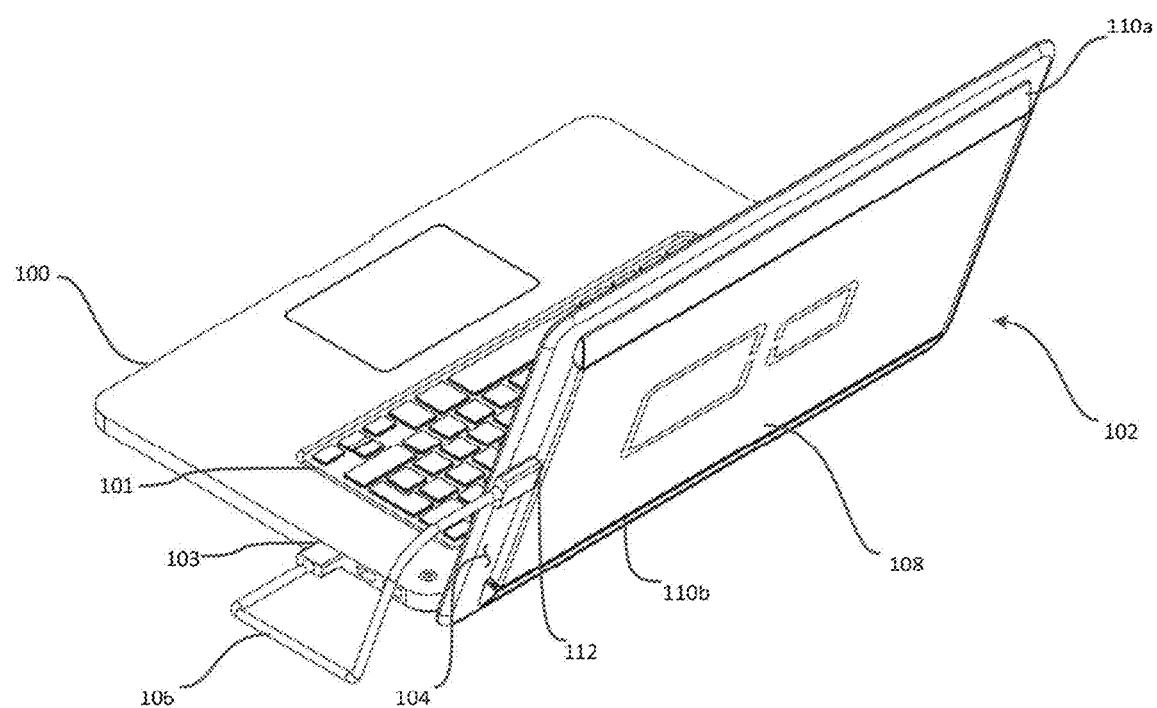
FIG. 1A illustrates a back perspective view of an auxiliary display system in a closed configuration according to an embodiment.

FIG. 1A illustrates a perspective view of a laptop computer 100 in combination with an auxiliary monitor 102 in a closed position according to one embodiment. The auxiliary monitor 102 may be configured to be removably coupled to a backplane 104 of the computer 100. The auxiliary monitor 102 may be further configured to be communicatively coupled to the laptop computer 100 via a wired connection 106.

The laptop computer 100 includes a keyboard portion 101 and a wired communications port 103. The auxiliary monitor 102 includes a display portion 108, a first rail 110a, a second rail 110*b*, and a wired communications port 112. The display portion 108 is generally configured to display information for viewing by a user. In some embodiments, the display portion 108 is configured to receive input information including, for example, touch inputs from a user's finger, inputs from a stylus operated by a user, and so forth.

In the embodiment illustrated by FIG. 1A, the display portion 108 is in a closed position such that a screen of the display portion 108 is not visible to a user. The first rail 110*a* and the second rail 110*b* are configured to allow the display portion 108 to slide in either direction of at least one dimension. The wired communications port 112 is configured to be coupled to the wired connection 106 to establish communication with the wired communications port 103. For example, the wired communications port 103 and the wired communications port 112 may be configured according to one of several standards, including DisplayPort, Mini DisplayPort, HDMI, VGA, DVI, USB-A, USB-C, Micro-USB, Mini-USB, and so forth. In some embodiments, the wired communications port 103 is configured according to the USB-C standard, the wired communications port 112 is configured according to the USB-A standard, and the wired connection 106 includes a USB-A to USB-C connection standard.

Figure 1B:
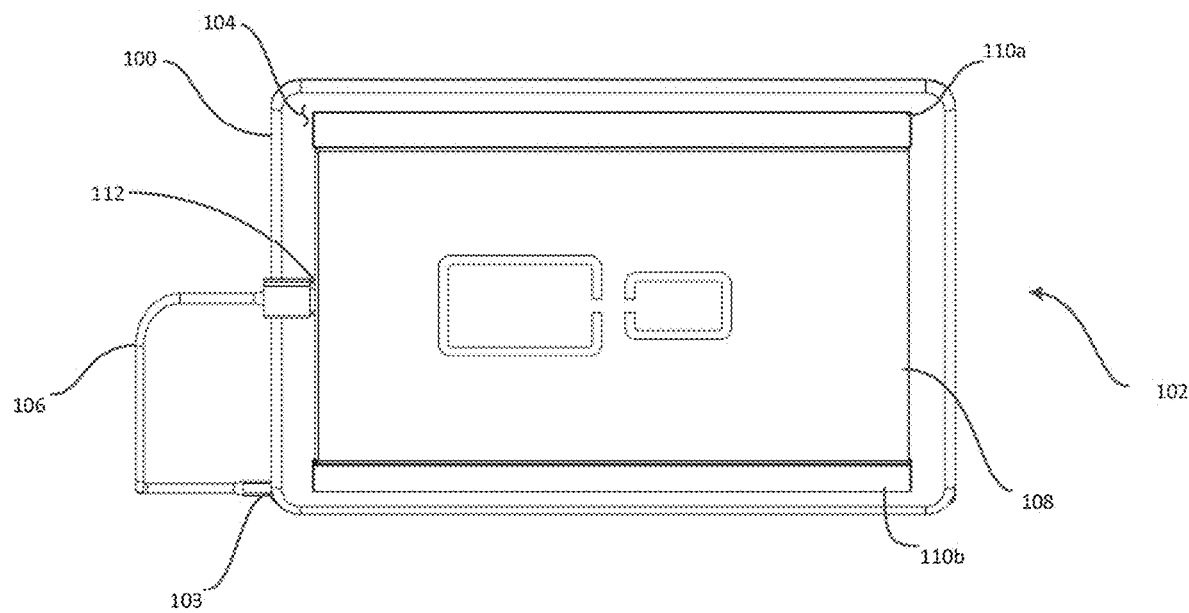
FIG. 1B illustrates a back view of the auxiliary display system in the closed configuration according to an embodiment.
Figure 1C:
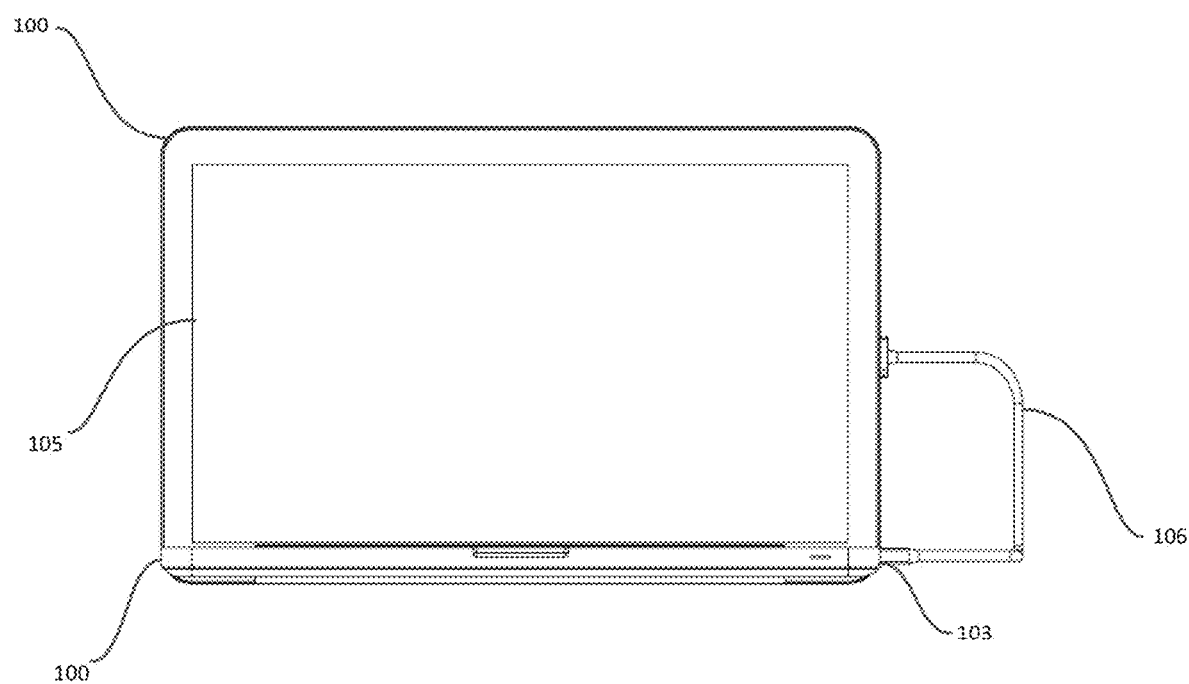
FIG. 1C illustrates a front view of the auxiliary display system in the closed configuration according to an embodiment.
Figure 1D:
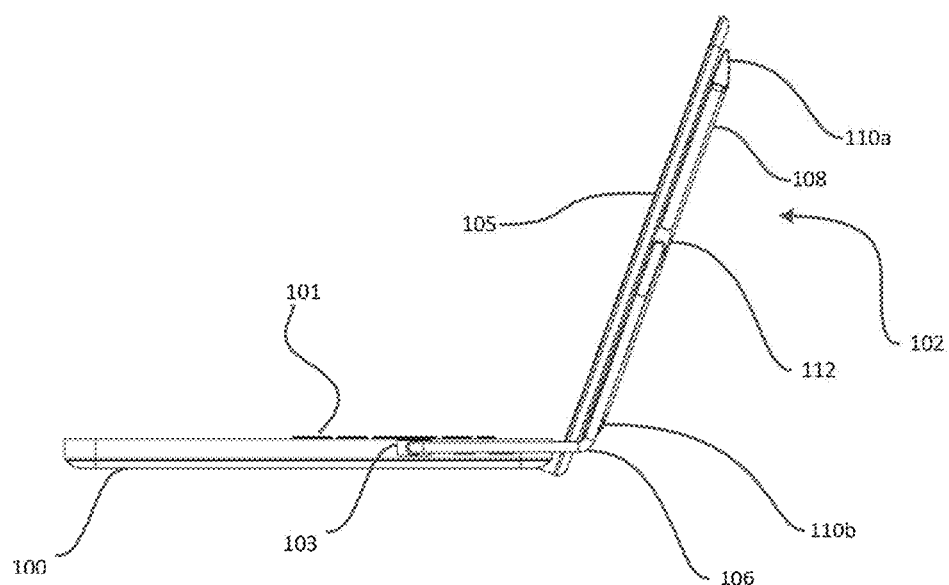
FIG. 1D illustrates a side view of the auxiliary display system in the closed configuration according to an embodiment.

FIG. 1B illustrates a back view of the laptop computer 100 in combination with the auxiliary monitor 102 in a closed position according to an embodiment. FIG. 1C illustrates a front view of the laptop computer 100 in combination with the auxiliary monitor 102 (not visible) in a closed position according to an embodiment. The laptop computer 100 includes a primary screen 105 configured to display output information to a user. FIG. 1D illustrates a side view of the laptop computer 100 in combination with the auxiliary monitor 102 in a closed position according to an embodiment.

As illustrated by the embodiment shown in FIGS. 1B and 1C, the diagonal screen measurement of the auxiliary monitor 102 is smaller than the diagonal screen measurement of the primary screen 105. The addition of the auxiliary monitor 102 therefore does not increase the footprint of the area of the laptop computer 100. Accordingly, when viewed from the perspective of FIG. 1C, the area of the primary screen 105 is not affected by the auxiliary monitor 102. As illustrated by FIG. 1D, the thickness of the auxiliary monitor 102 adds a relatively small increase in total thickness when coupled with the laptop computer 100.

For example, in some embodiments, the auxiliary monitor 102 may have a thickness of approximately 0.34". The diagonal screen measurement of the display portion 108 may be selected according to the diagonal screen measurement of the laptop computer 100 display screen. For example, for a laptop computer screen having a diagonal screen measurement of approximately 13.3", the display portion 108 may have a diagonal screen measurement of approximately 12.5" in some embodiments. It is to be appreciated that the display portion 108 may be manufactured with any diagonal screen measurement desired, and no limitation is meant to be implied by the foregoing values. For example, the display portion 108 could have a diagonal screen measurement which is larger than a diagonal screen measurement of a screen of the laptop computer to which the display portion 108 is attached.

Figure 2A:
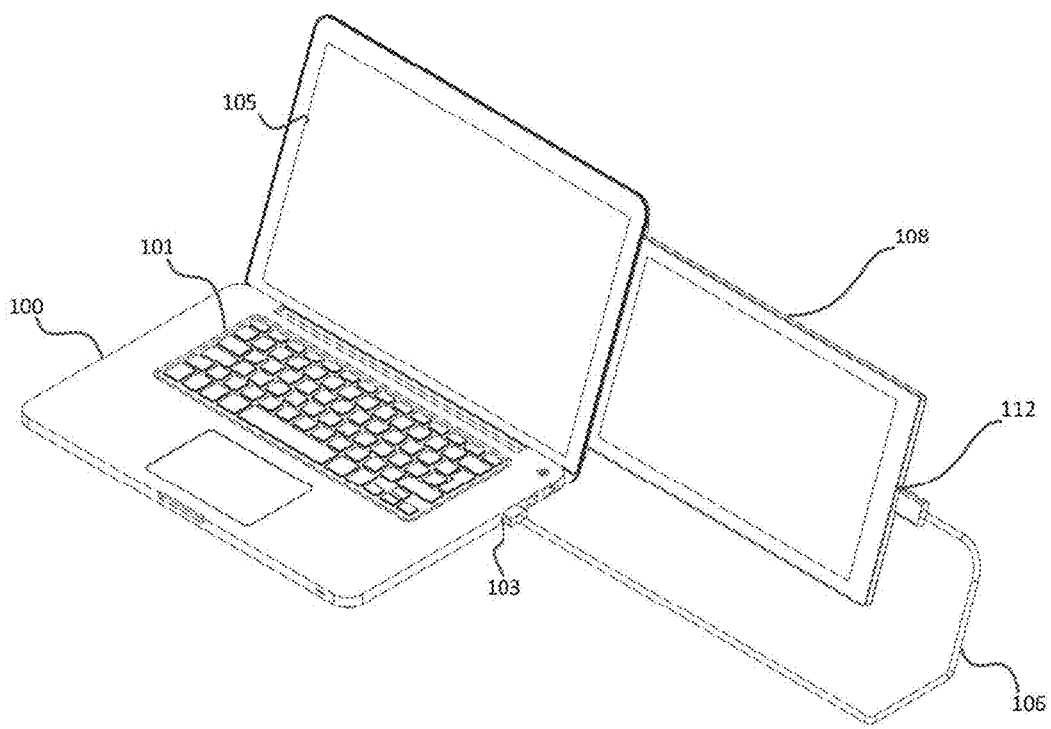
FIG. 2A illustrates a front perspective view of the auxiliary display system in an open configuration according to an embodiment.

FIG. 2A illustrates a perspective view of the laptop computer 100 in combination with the auxiliary monitor 102 in an "open position" according to an embodiment. According to at least one example, the auxiliary monitor 102 is in an open position when the display portion 108 is at least partially visible to at least one user. For example, the auxiliary monitor 102 may be at least partially visible when the display portion 108 is slid at least partially out from behind the primary screen 105.

Figure 2B:
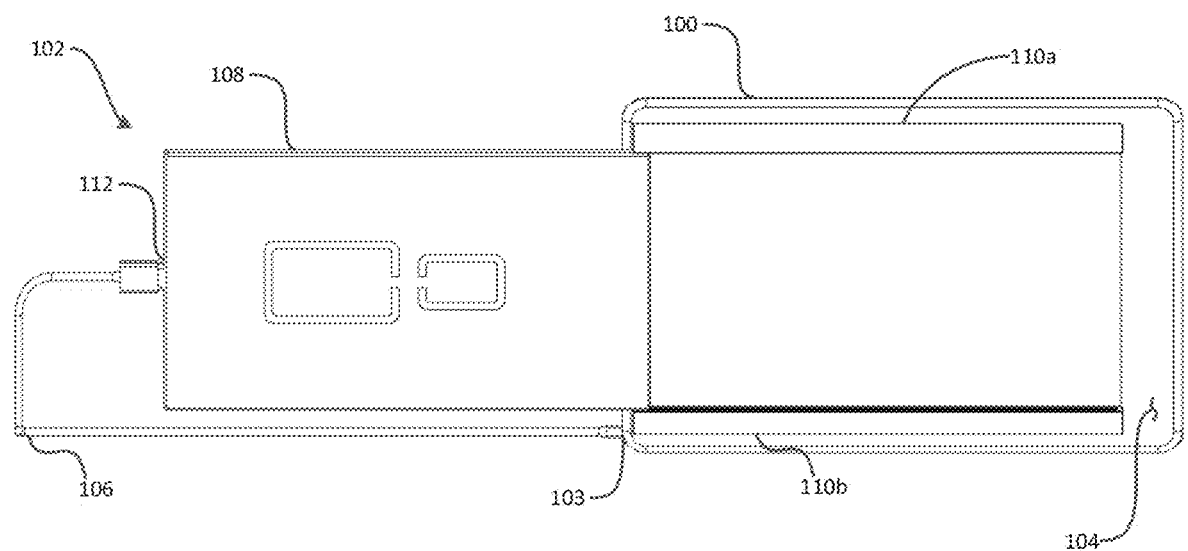
FIG. 2B illustrates a back view of the auxiliary display system in the open configuration according to an embodiment.

FIG. 2B illustrates a back view of the laptop computer 100 in combination with the auxiliary monitor 102 in an open position according to an embodiment. The display portion 108 may be considered to be in a "fully open" position, as defined by the display portion 108 being fully extended in one dimension along the rails 110*a*, 110*b*. Stated differently, the display portion 108 is in a fully open position when the display portion 108 is incapable of being slid any further along the rails 110*a*, 110*b* in one direction. In some embodiments, the display portion 108 may be considered to be in a "partially open" position when the display portion 108 is between a closed position and a fully open position and is capable of further extension and retraction in at least one direction.

The auxiliary monitor 102 may be configured to enter a sleep state responsive to determining that the auxiliary monitor 102 is in a particular position. The sleep state may include, for example, implementing a reduced set of functionality, disabling the display portion 108 from receiving or displaying information, and so forth. For example, the auxiliary monitor 102 may be configured to enter the sleep state and disable the display portion 108 from displaying information responsive to determining that the display portion 108 is in a closed position, and may be configured to re-enable the display portion 108 to display information responsive to determining that the display portion 108 has been slid into one of a partially open position and a fully open position.

Figure 3:
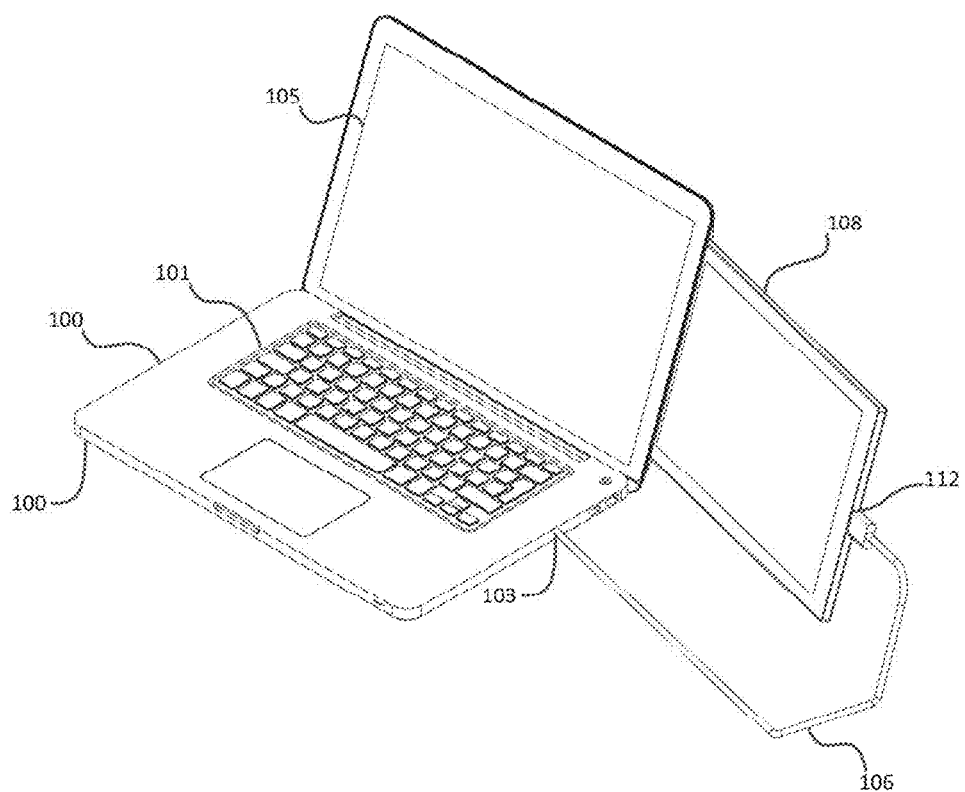
FIG. 3 illustrates a front perspective view of the auxiliary display system according to an embodiment.

FIG. 3 illustrates a perspective view of the laptop computer 100 in combination with the auxiliary monitor 102 in an open, "non-parallel" configuration according to an embodiment. According to at least one example, the auxiliary monitor 102 is in a non-parallel configuration when the display portion 108 is rotated to an orientation that is not parallel or antiparallel to the screen of the laptop computer 100. In at least one example, the auxiliary monitor 102 is in a parallel configuration when the display portion 108 is not rotated relative to the closed position, and is parallel to the primary screen 105.

In some embodiments, the display portion 108 may be rotated approximately 90° relative to the parallel configuration towards the primary screen 105. The display portion 108 may be rotated approximately 180° relative to the parallel configuration away from the primary screen 105 such that the display portion 108 is antiparallel to the primary screen 105. In some embodiments, the auxiliary monitor 102 is considered to be in a "tabletized" configuration when the display portion 108 is antiparallel to the primary screen 105.

Figure 4A:
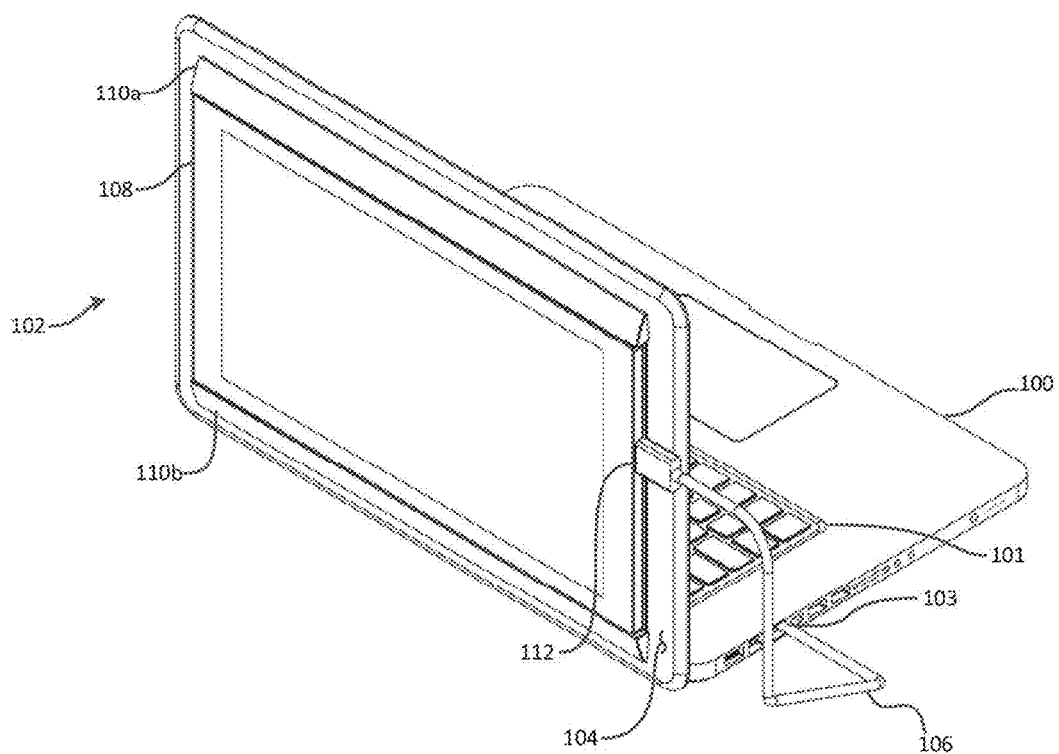
FIG. 4A illustrates a back perspective view of an auxiliary monitor in a tabletized configuration according to an embodiment.
Figure 4B:
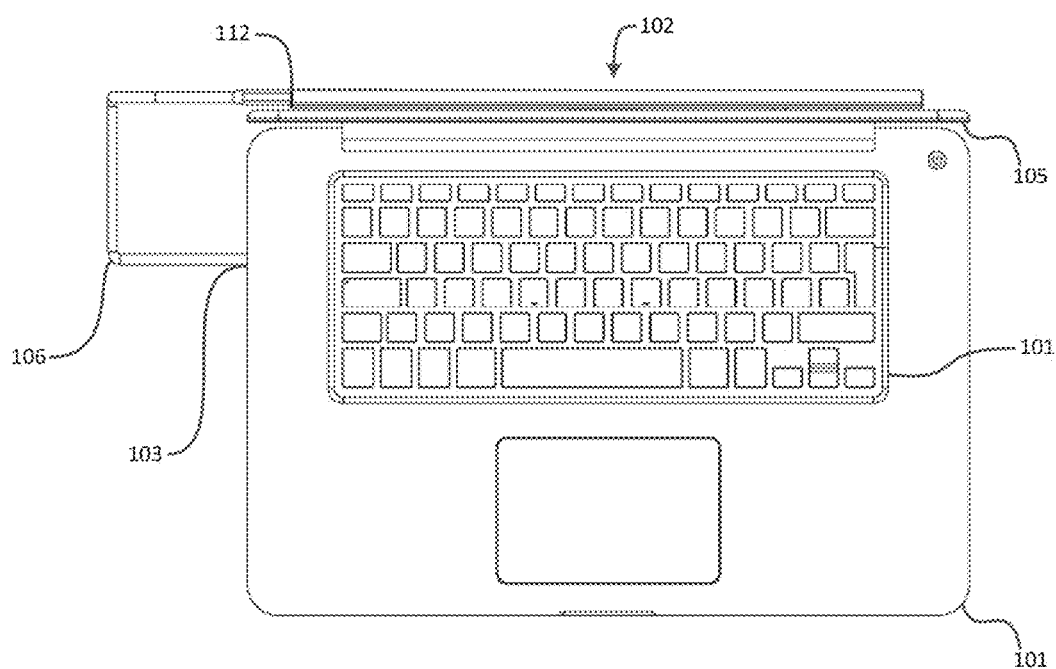
FIG. 4B illustrates a top view of the auxiliary monitor in the tabletized configuration according to an embodiment.

FIG. 4A illustrates a back perspective view of the laptop computer 100 in combination with the auxiliary monitor 102 in the tabletized configuration according to an embodiment. FIG. 4B illustrates a top view of the laptop computer 100 in combination with the auxiliary monitor 102 in a tabletized configuration according to another embodiment. In some embodiments, the auxiliary monitor 102 is flush with the rails 110*a*, 110*b* in the tabletized configuration (i.e., the rails 110*a*, 110*b* and the display portion 108 extend from the backplane 104 by equal distances).

As illustrated by FIGS. 4A and 4B, the display portion 108 is antiparallel with the primary screen 105 in the tabletized configuration. The tabletized configuration may be considered particularly advantageous in various situations, including situations in which the auxiliary monitor 102 is used in a manner similar to a tablet computer. In at least one embodiment, the functionality of the auxiliary monitor 102 does not change regardless of the orientation of the display portion 108. The auxiliary monitor 102 may be capable of receiving input information (for example, from a stylus) and providing output information (for example, displaying a video) in any configuration and orientation. However, users may consider the tabletized configuration to be more advantageous than other configurations for certain tasks, such as writing on the display portion 108 with a stylus, because the tabletized configuration provides an ergonomic and stable working surface for users.

Although FIGS. 4A and 4B illustrate the laptop computer 100 as being in an open configuration (i.e., a configuration in which the primary screen 105 is not anti-parallel with the keyboard portion 101), the auxiliary monitor 102 may also operate in the tabletized configuration when the laptop computer is in a closed configuration (i.e., a configuration in which the primary screen 105 is anti-parallel with the keyboard portion 101).

The laptop computer 100 may be configured to enter a sleep state responsive to detecting that the laptop computer is in a closed configuration. In some embodiments, the laptop computer 100 is configured to implement a reduced set of functionality in the sleep state. In other embodiments, the laptop computer 100 may disable the primary screen 105 from displaying output information in the sleep state. The auxiliary monitor 102 may be capable of operating normally by receiving input information and displaying output information even when the laptop computer 100 is in a sleep state.

Figure 5:
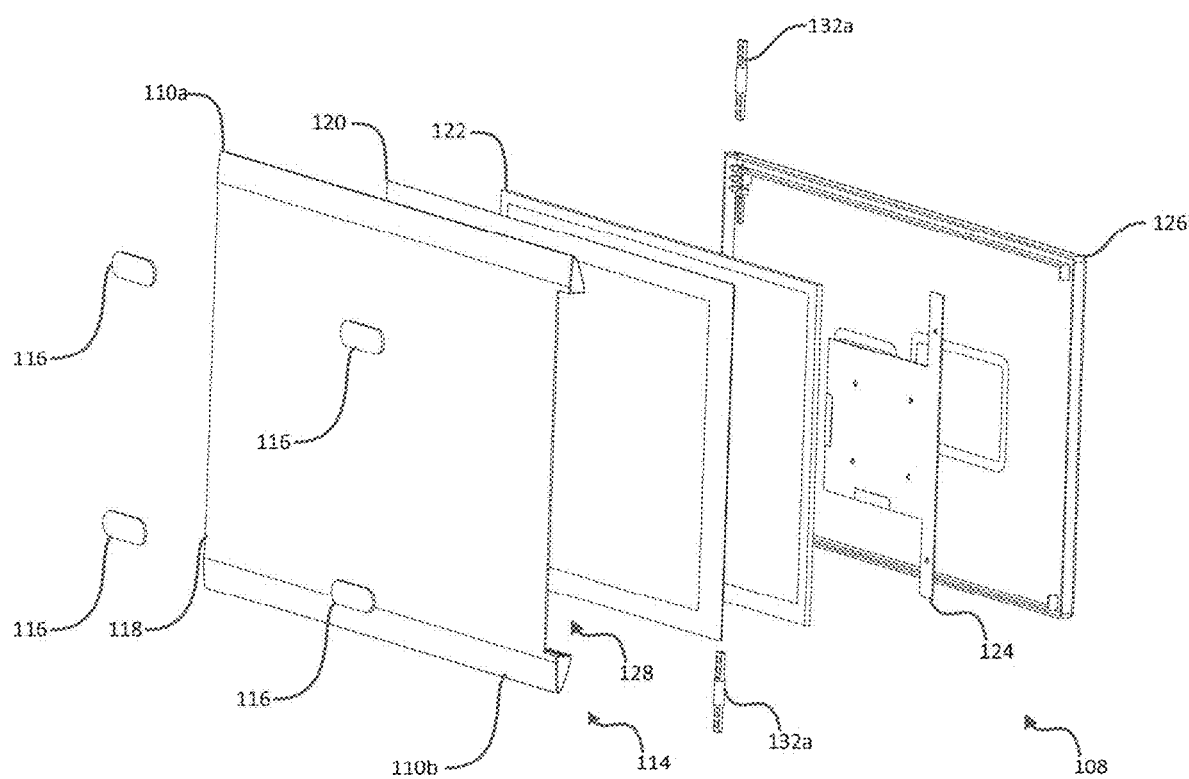
FIG. 5 illustrates an exploded view of the auxiliary monitor according to an embodiment.

The auxiliary monitor 102 will now be described in greater detail with respect to FIGS. 5-7. FIG. 5 illustrates an exploded view of the auxiliary monitor 102 according to an embodiment. The auxiliary monitor 102 generally includes a mounting portion 114, and the display portion 108. The mounting portion 114 includes coupling elements 116 and a mount 118. The display portion 108 includes a front cover 120, a display screen 122, a Printed Circuit Board (PCB) 124, and a back cover 126. In some embodiments, the front cover 120 and the display screen 122 may comprise a single entity, and are identified as separate elements for explanatory purposes only.

The coupling elements 116 are configured to couple the auxiliary monitor 102 to the laptop computer 100, as discussed in greater detail below. The mount 118 is configured to be slidably and rotatably coupled to the display portion 108, as discussed in greater detail below. The front cover 120 and the back cover 126 are configured to encapsulate the display screen 122 to prevent damage to, and displacement of, the display screen 122. The front cover 120 may be constructed of a conductive material that enables a touch input on a first side of the front cover 120 to be sensed by the display screen 122 on the second side of the front cover 120. For example, the front cover 120 may be constructed of a conductive glass material.

The display screen 122 is configured to receive input information, such as touch inputs, and provide output information, such as a video display, as discussed in greater detail below. The display screen 122 may also be configured to receive one or more control signals from the PCB 124. The PCB 124 may be configured to communicate one or more control signals to the display screen 122 depending on a position, orientation, or configuration of the display portion 108. For example, the PCB 124 may communicate a sleep signal to the display screen 122 responsive to determining that the display portion 108 is in a closed position.

In some embodiments, the PCB 124 may be further configured to communicate one or more control signals to the laptop computer 100. For example, the PCB 124 may be configured to receive a first set of one or more signals indicative of a touch input on the display screen 122, and communicate a second set of one or more signals (for example, derived from the first set of one or more signals) to the laptop computer 100.

As discussed above, the back cover 126 is configured to prevent damage to, and displacement of, the display screen 122. The back cover 126 is also configured to interface with the mount 118 to allow the display portion 108 to be slidably connected to the mount 118, as discussed in greater detail below.

The coupling elements 116 will now be described in greater detail. As discussed above, the coupling elements 116 are configured to connect the auxiliary monitor 102 to the laptop computer 100. For example, the coupling elements 116 may be adhesive magnets having an adhesive side and a magnetic side. For example, the adhesive side may include a chemical substance which binds one or more objects together and resists the objects' physical separation, such as glue. The adhesive side may be coupled to the mount 118, and the magnetic side may be configured to be coupled with a corresponding magnetic surface. For example, the laptop computer 100 may be coupled to one or more adhesive magnets each having an adhesive side coupled to the laptop computer 100, and a magnetic side configured to be coupled to a corresponding coupling element of the coupling elements 116.

The implementation of adhesive magnets for the coupling elements 116 allows the auxiliary monitor 102 to be removably coupled to the laptop computer 100. The magnetic strength of the magnets may be selected such that the auxiliary monitor 102 does not become inadvertently decoupled from the laptop computer 100, while allowing a user to decouple the auxiliary monitor 102 from the laptop computer 100 by pulling the auxiliary monitor 102 apart from the laptop computer 100.

In other embodiments, the coupling elements 116 may not be adhesive magnets. For example, the coupling elements 116 may each have an adhesive side and a hook-and-loop side to enable the auxiliary monitor 102 to be removably coupled to the laptop computer 100. In other examples, both sides of the coupling elements 116 may be adhesive. In still other embodiments, the coupling elements 116 may include two or more of the foregoing examples. It is to be appreciated that, although four coupling elements 116 are illustrated, any number of coupling elements may be implemented in other embodiments.

The mount 118 will now be discussed in greater detail. The mount 118 includes the first rail 110*a*, the second rail 110*b*, and a notch 128. As discussed above, the first rail 110*a* and the second rail 110*b* are configured to be coupled to the display portion 108 to allow the display portion 108 to slide relative to the mount 118. The notch 128 is a cut-away from the mount 118 to provide the display portion 108 with any clearance necessary to rotate freely. For example, the notch 128 may be as long or longer than the length of the display portion 108 and as wide or wider than the thickness of the display portion 108.

Figure 6:
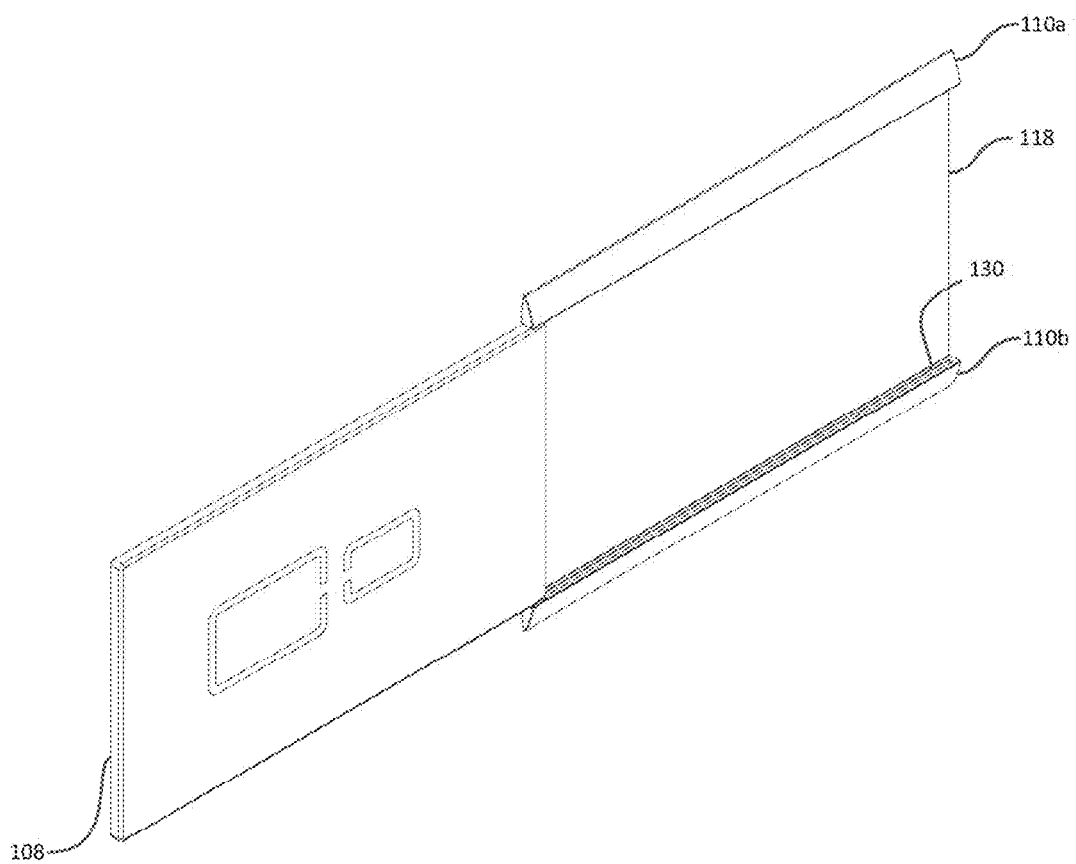
FIG. 6 illustrates a back perspective view of the auxiliary monitor according to an embodiment.

FIG. 6 illustrates the auxiliary monitor 102 from a back perspective view according to an embodiment. As illustrated by FIG. 6, the mount 118 includes a groove 130 in the second rail 110*b* to slidably couple with the display portion 108. For example, the display portion 108 may include a protrusion configured to protrude into, and slide along, the groove 130. In some embodiments, the first rail 110a may include a similar groove (not illustrated) configured to slidably couple with a second protrusion of the display portion 108.

The display screen 122 will now be discussed in greater detail. The display screen 122 may be configured to receive input information and provide output information. For example, in some embodiments, the display screen 122 may be implemented as a tablet computer. To receive input information, the display screen 122 may include a touch-sensitive surface configured to respond to touch inputs from a user's finger, a stylus, and so forth. For example, as discussed above, the front cover 120 may be part of the display screen 122 and may act as a touch-sensitive surface for the display screen 122. To provide output information, the display screen 122 may display information to a user, similar to a computer monitor.

The display screen 122 may also include a wired or wireless communications interface to exchange information with one or more computers. For example, the display screen 122 may include a communications interface to exchange information with the laptop computer 100, such information provided by the laptop computer 100 indicating display information to be output by the display portion 108.

In at least one embodiment, a wired communications interface is embodied by the wired communications port 112. The wired communications port 112 enables the display screen 122 to exchange information with the laptop computer 100 via the wired connection 106. In some embodiments, the display screen 122 may include a wireless communications interface instead of, or in addition to, the wired communication interface. For example, the display screen 122 may include a wireless communications interface configured to enable wireless communication with the laptop computer 100.

In some embodiments, the display screen 122 may include a controller. The controller may be configured to generate one or more control signals to control operation of the display screen 122. For example, the controller may generate one or more control signals to display output information on the display screen 122 in response to input information received by the display screen 122 from, for example, the PCB 124. In some embodiments, the controller operates in conjunction with the laptop computer 100. In other embodiments, the controller operates without communicating with the laptop computer 100. In still other embodiments, the display screen 122 may not include a controller, and may instead receive control signals solely from at least one of the laptop computer 100 and the PCB 124.

The back cover 126 will now be discussed in greater detail. The back cover 126 is configured to be coupled to the display screen 122, and includes a first hinge 132a and a second hinge 132b configured to couple to the mount 118. The hinges 132a, 132b may be configured to protrude into the rails 110a, 110b, respectively, of the mount 118. In some embodiments, the hinges 132a, 132b may be configured to slide in direct contact with the rails 110a, 110b.

Figure 7:
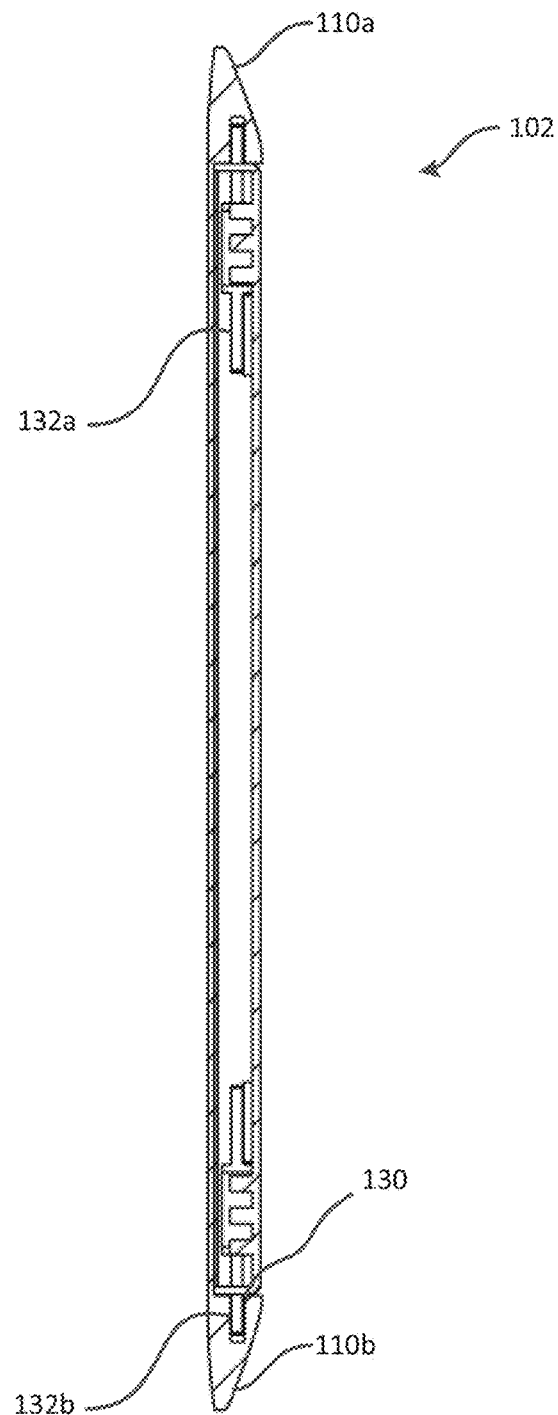
FIG. 7 illustrates a cross-sectional view of the auxiliary monitor according to an embodiment.

FIG. 7 illustrates a side cross-sectional view of the auxiliary monitor 102 according to an embodiment. The second hinge 134b may protrude into the groove 130 of the second rail 110b, and the first hinge 134a may protrude into a similar groove in the first rail 110a. The hinges 132a, 132b may be configured such that, when the display portion 108 is in a fully open position (i.e., the display portion 108 is slid as much as possible in one direction), the display portion 108 is capable of being rotated about the hinges 132a, 132b to a desired orientation.

Alternative coupling mechanisms between the back cover 126 and the mount 118 are intended to be within the scope of this disclosure. Although the foregoing description notes that the hinges 132a, 132b may be configured to slide in direct contact with the rails 110a, 110b, in alternate embodiments, other sliding mechanisms may be implemented. For example, ball bearings may be implemented to facilitate sliding between the hinges 132a, 132b and the rails 110a, 110b. In still other examples, roller mechanisms may be implemented to facilitate sliding between the hinges 132a, 132b and the rails 110a, 110b. As discussed in greater detail below, in alternate embodiments, alternate implementations of the hinges 132a, 132b and the rails 110a, 110b may be within the scope of this disclosure.

An auxiliary monitor has been disclosed. The auxiliary monitor is capable of receiving input information from a user and providing output information to a user. The auxiliary monitor increases the physical footprint of an associated laptop computer by a marginal amount, while providing significant benefits in the amount of information that can be exchanged between the user and the combination of the laptop computer and the auxiliary monitor. The auxiliary monitor also expands the functionality of the laptop computer, such as by allowing the auxiliary monitor to be used in a similar manner as a tablet computer.

No limitation of the auxiliary monitor is meant to be implied by the word "auxiliary." The auxiliary monitor may be used even when the laptop computer is in an idle or sleep mode such that the auxiliary monitor is the only active monitor. For example, the laptop computer may be closed while the user continues to use the auxiliary monitor. Furthermore, no limitation is meant to be implied by the word "monitor." Although some embodiments of the auxiliary monitor are capable of displaying output information, some embodiments of the auxiliary monitor are also capable of receiving input information from a user, such as via touch inputs. In alternate embodiments, the auxiliary monitor is only capable of displaying information to a user, and receiving information the laptop computer, but incapable of receiving touch inputs from a user.

The auxiliary monitor may be any size and may have any desired dimensions. Although some of the foregoing embodiments illustrate the auxiliary monitor as having a smaller screen area than that of the corresponding laptop computer, in alternate embodiments, the auxiliary monitor may have a screen area that is larger than that of the corresponding laptop computer.

In some embodiments, the auxiliary monitor is communicatively coupled to the laptop computer via a wired connection. In some implementations, a user may desire the wired connection to be on one side or the other of the laptop computer. To reverse the auxiliary monitor, the auxiliary monitor can be decoupled from the backplane of the laptop computer, rotated 180° about a vector normal to the backplane of the laptop computer, and re-coupled to the backplane of the laptop computer, effectively moving the wired connection between the left and right sides of the laptop computer for ease of use by a user.

As discussed above, an auxiliary monitor may be slidably and rotatably coupled to a mount coupled to a primary display. For example, the auxiliary monitor may be able to slide relative to the mount along at least one rail, and may be able to rotate relative to the mount about at least one hinge. One embodiment is discussed above with respect to the hinges 132a, 132b and the rails 110a, 110b.

Figure 8:
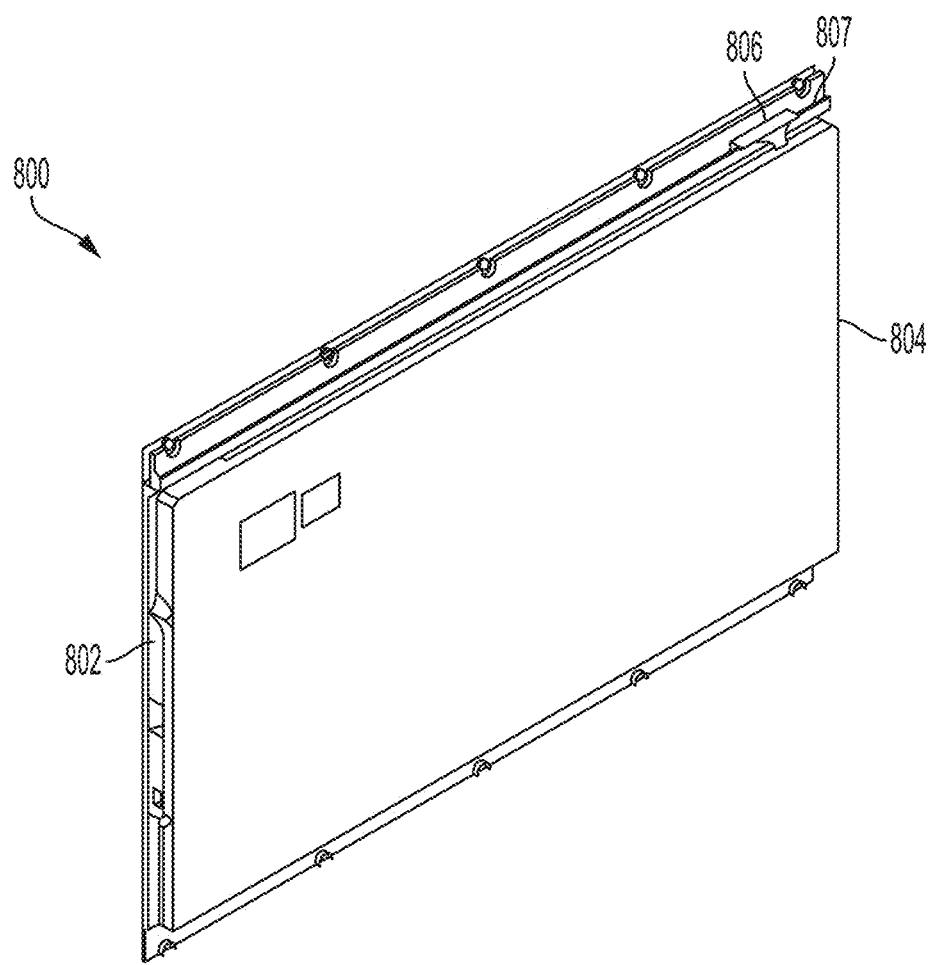
FIG. 8 illustrates a perspective view of an auxiliary monitor according to an embodiment.

FIG. 8 illustrates a perspective view of an auxiliary display system 800 according to another embodiment. The auxiliary display system 800 includes a mount 802, an auxiliary display 804, and a hinge assembly 806. The mount 802 is configured to be coupled to a primary surface, such as a backplane of a laptop computer, and is configured to be slidably coupled to the hinge assembly 806. The auxiliary display 804 is configured to be coupled to the hinge assembly 806. The hinge assembly 806 is configured to be slidably and rotatably coupled to the mount 802. For example, and as discussed in greater detail below, the mount 802 may include a track 807 configured to engage with the hinge assembly 806.

Figure 9C:
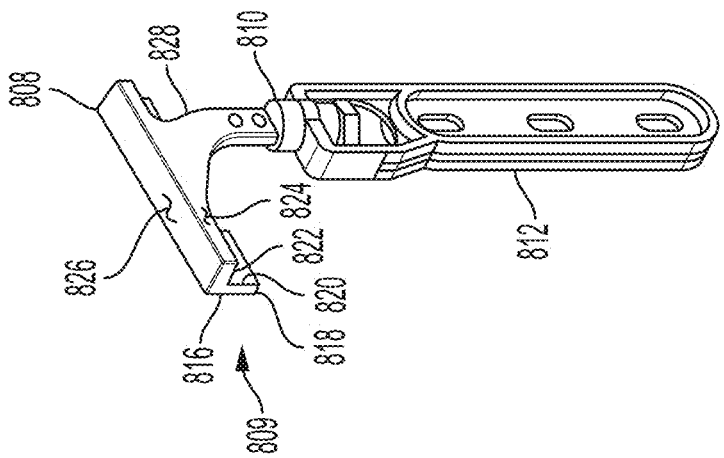
FIG. 9C illustrates a perspective view of the hinge assembly according to an embodiment.
Figure 9B:
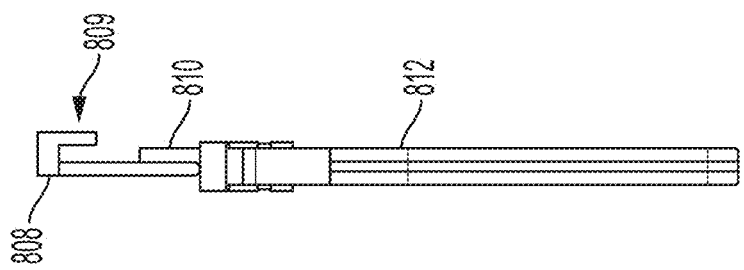
FIG. 9B illustrates a front view of the hinge assembly according to an embodiment.
Figure 9A:
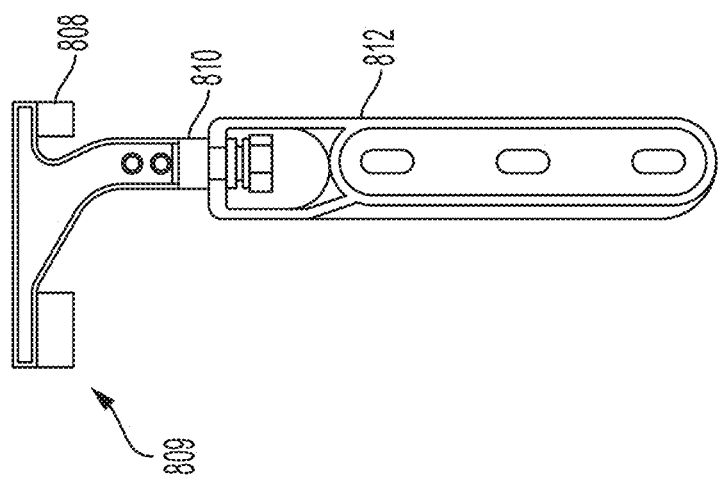
FIG. 9A illustrates a side view of a hinge assembly according to an embodiment.

An embodiment of the hinge assembly 806 will now be discussed with respect to FIGS. 9A-9C. FIG. 9A is a side view of the hinge assembly 806 according to an embodiment. FIG. 9B is a front view of the hinge assembly 806 according to an embodiment. FIG. 9C is a perspective view of the hinge assembly 806 according to an embodiment.

The hinge assembly 806 includes a carriage head 808, a carriage head mount 810, and a mounting block 812. The carriage head 808 is configured to be slidably coupled to a mount, such as the mount 802. For example, the carriage head 808 may be configured to be coupled to the track 807 of the mount 802. More specifically, a protrusion 809 of the carriage head 808 may be configured to protrude into the track 807, as discussed in greater detail below.

The carriage head mount 810 is configured to be coupled to the carriage head 808, and is configured to be rotatably coupled to the mounting block 812. For example, and with reference to FIG. 9A, the carriage head mount 810 may be configured to rotate about the Y-axis. The mounting block 812 is configured to be rotatably coupled to the carriage head mount 810, and is configured to be coupled to a display portion. For example, the mounting block 812 may be configured to be coupled to the auxiliary display 804. In some embodiments, in which the mounting block 812 is coupled to the auxiliary display 804, the carriage head 808 and the carriage head mount 810 may enable the auxiliary display 804 to be slidably and rotatably coupled, respectively, to the mount 802.

In at least one embodiment, the carriage head 808 may be configured to engage the track 807 at four points of contact identified below. Maximizing a number of points of contact between the carriage head 808 and the track 807 may distribute mechanical stress across a greater area of the carriage head 808 and the track 807, thereby decreasing an amount of mechanical stress placed on any one point of either the carriage head 808 or the track 807. Decreasing the amount of mechanical stress placed on any one point of either the carriage head 808 or the track 807 may increase the longevity of the carriage head 808 and/or the track 807.

For example, and with reference to FIG. 9C, the carriage head 808 includes a first side 816, a second side 818, a third side 820, a fourth side 822, a fifth side 824, a sixth side 826, and a stem portion 828. The first side 816 is perpendicularly connected to the second side 818 at a first vertex, and is perpendicularly connected to the sixth side 826 at a second vertex. The second side 818 is perpendicularly connected to the first side 816 at a first vertex, and is perpendicularly connected to the third side 820 at a second vertex. The third side 820 is perpendicularly connected to the second side 818 at a first vertex, and is perpendicularly connected to the fourth side 822 at a second vertex.

The fourth side 822 is perpendicularly connected to the third side 820 at a first vertex, and is perpendicularly connected to the fifth side 824 at a second vertex. The fifth side 824 is perpendicularly connected to the fourth side 822 at a first vertex, and is perpendicularly coupled to the sixth side 826 at a second vertex. The sixth side 826 is perpendicularly connected to the first side 816 at a first vertex, and is perpendicularly coupled to the fifth side 824 at a second vertex. The stem portion 828 is coupled to, and extends from, the fifth side 824.

Figure 10:
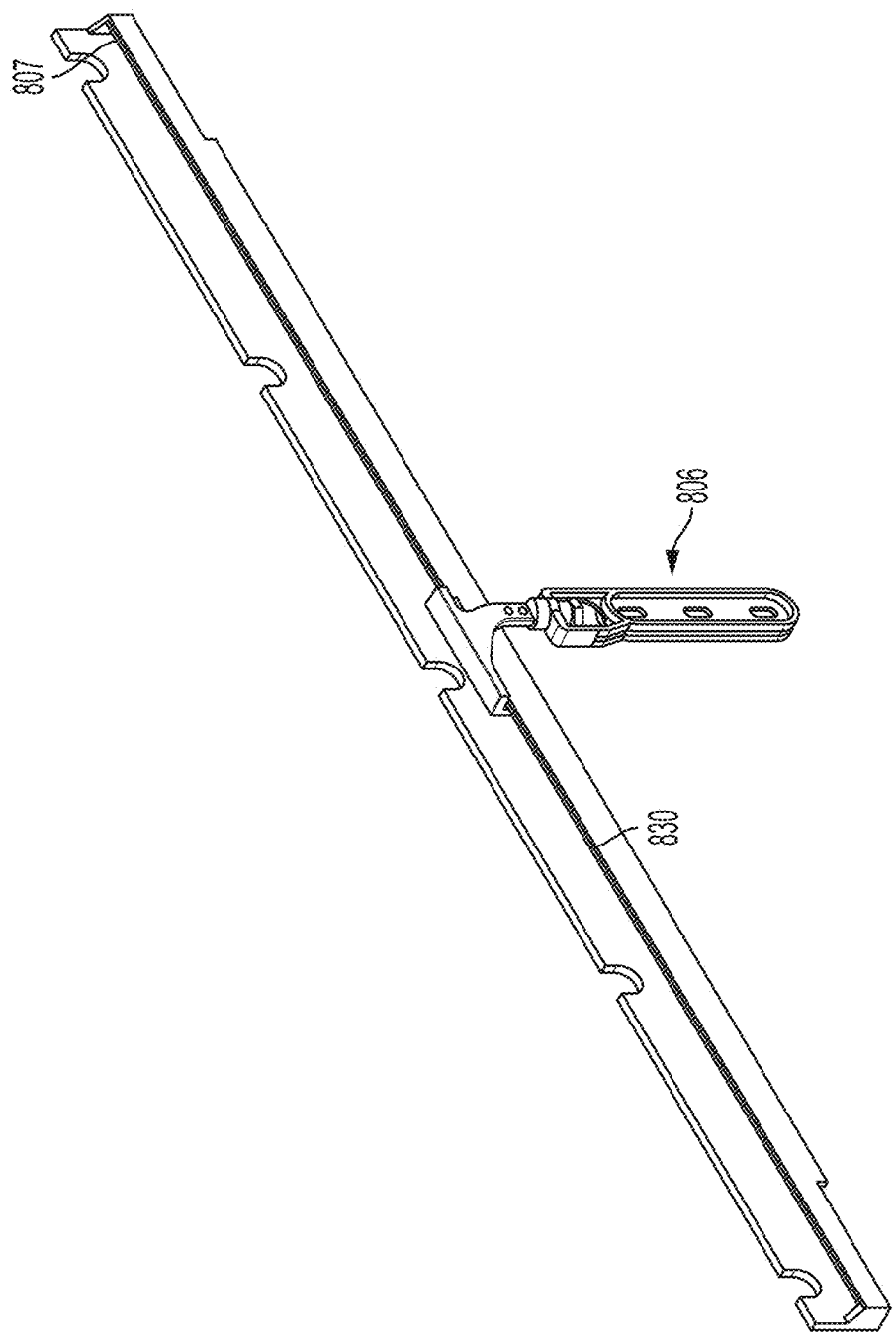
FIG. 10 illustrates a perspective view of the hinge assembly in connection with a track according to an embodiment.

As discussed above, in at least one embodiment, the carriage head 808 is configured to engage the track 807 at four points of contact. FIG. 10 illustrates a perspective view of the hinge assembly 806 coupled to the track 807 according to an embodiment. For clarity of illustration, the sides 816-826 are not labeled. As illustrated by FIG. 10, the carriage head 808 of the hinge assembly 806 is configured to contact the track 807 at the first side 816, the second side 818, the third side 820, and the fourth side 822. The protrusion 809 of the carriage head 808 formed by the first side 816, the second side 818, and the third side 820 is configured to protrude into the track 807. The fourth side 822 of the carriage head 808 contacts a top surface 830 of the track 807.

Figure 11:
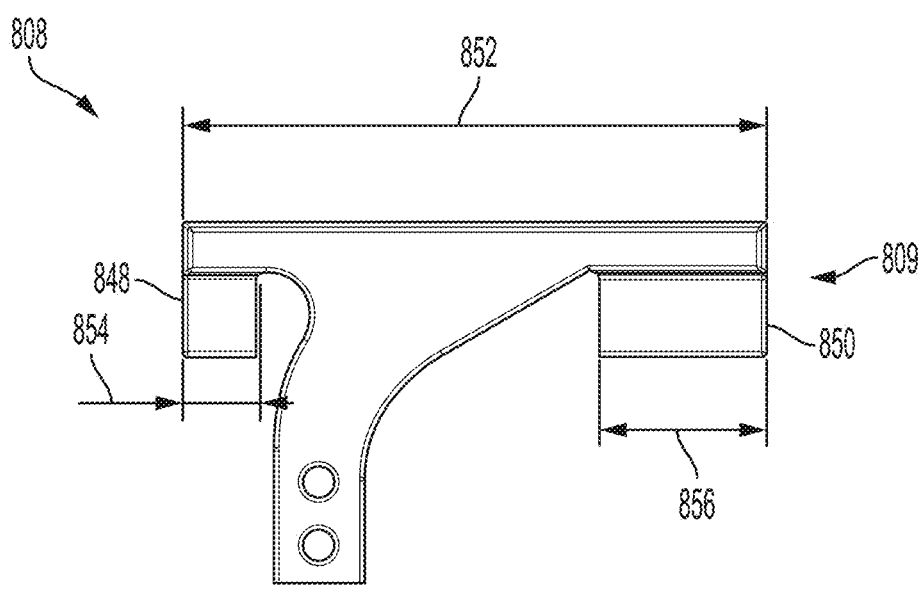
FIG. 11 illustrates a side view of the hinge assembly according to an embodiment.

FIG. 11 illustrates a side view of a portion of the carriage head 808 according to an embodiment. The carriage head 808 includes the protrusion 809. The protrusion 809 includes a first track engagement member 848 and a second track engagement member 850. The protrusion 809 has a length measurement 852, the first track engagement member 848 has a length measurement 854, and the second track engagement member 850 has a length measurement 856.

In one embodiment, the first track engagement member 848 may be spaced apart from the second track engagement member 850. For example, the length measurement 852 of the protrusion 809 may be approximately 1.10 inches, the length measurement 854 of the first track engagement member 848 may be approximately 0.15 inches, and the length measurement 856 of the second track engagement member 850 may be approximately 0.31 inches. Accordingly, a space of approximately 0.64 inches may exist between the first track engagement member 848 and the second tack engagement member 850.

In at least one embodiment, the protrusion 809 is configured having a length sufficient to satisfy at least two functions. First, in some embodiments, the auxiliary display system 800 may include two tracks (for example, similar to the track 807) attached to the mount 802. For example, the auxiliary display system 800 may include a track at a top side of the mount 802 and a bottom side of the mount 802, each of which is configured to be coupled to a respective hinge assembly. In some embodiments, it may be advantageous for the two respective hinge assemblies to begin sliding relative to the mount 802 simultaneously, which may be difficult where an engagement length of the respective hinge assemblies are relatively short. Accordingly, a length of the protrusions of the hinge assemblies (for example, the length measurement 852 of the protrusion 809) are selected to be long enough to prevent misalignment of the top and bottom hinge assemblies included in certain embodiments.

Second, in some embodiments, it is to be appreciated that an auxiliary display (for example, the auxiliary display 804) may be fully extended relative to a primary display connected to the auxiliary display via a mount (for example, the mount 802). As the auxiliary display is extended, a moment may be created about an edge of the primary display, where the moment increases as the auxiliary display extends further. It may be advantageous to prevent the auxiliary display from being extended far enough to cause the primary display to tip over about the edge of the primary display. Accordingly, the length of a protrusion (for example, the length measurement 852 of the protrusion 809) may be selected such that the auxiliary display (for example, the auxiliary display 804) does not cause a primary display to tip over due to the moment generated by the auxiliary display.

In some embodiments, it may be advantageous for the auxiliary display 804 to lock into place when fully extended. Locking into place may include a configuration wherein the auxiliary display 804 is not easily slidable about the track 807, but which may be easily unlocked by a user. To provide a locking mechanism in certain embodiments, protrusion the first track engagement member 848 and the second track engagement member 850 may be configured to accommodate a detent. For example, the first track engagement member 848 and the second track engagement member 850 may be positioned to provide a space between the members 848, 850 which may receive the detent. The detent may resist sliding of the auxiliary display 804 relative to the track 807 below a minimum amount of force applied to the auxiliary display 804 in the direction which the auxiliary display 804 is configured to slide. For example, the detent may extend between the protrusion first track engagement member 848 and the second track engagement member 850 when the auxiliary display 804 is fully extended to resist sliding of the auxiliary display 804. However, if a minimum amount of force is applied to the auxiliary display 804 in the direction which the auxiliary display 804 is configured to slide, at least one of the first track engagement member 848 and the second track engagement member 850 is configured to exert a force on the detent to remove the detent from the space between the members 848, 850, thereby unlocking the auxiliary display 804.

Figure 12:
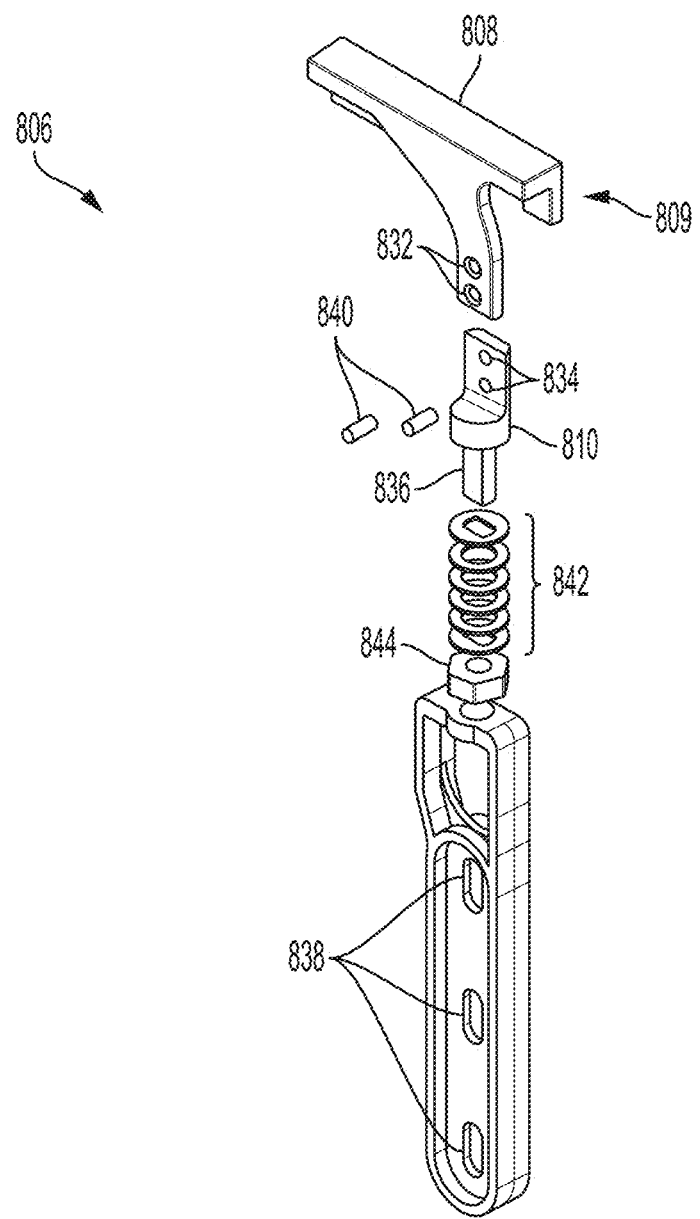
FIG. 12 illustrates an exploded view of the hinge assembly according to an embodiment.

FIG. 12 illustrates an exploded view of the hinge assembly 806 according to an embodiment. As discussed above, the hinge assembly 806 includes the carriage head 808, the carriage mount 810, and the mounting block 812. The carriage head 808 includes openings 832 respectively configured to receive a fastener, as discussed in greater detail below. The carriage mount 810 includes openings 834 respectively configured to receive a fastener, as discussed in greater detail below. The carriage mount 810 further includes a chamfered protrusion 836 configured to be coupled to the mounting block 812.

The mounting block 812 includes openings 838 respectively configured to receive a fastener (not illustrated). For example, the openings 838 may be configured to receive a fastener to couple the mounting block 812 to a display portion. For example, the openings 838 may be configured to receive fasteners to couple the mounting block 812 to the auxiliary display 804.

In at least one embodiment, the carriage head 808 may be configured to be coupled to the carriage mount 810 by fasteners 840. For example, the fasteners 840 may be rivets respectively configured to be inserted into one of the openings 832 and one of the openings 834. In one embodiment, the fasteners 840 may include two rivets, the openings 832 may include two openings, and the openings 834 may include two openings.

In at least one embodiment, the carriage mount 810 is configured to be coupled to the mounting block 812 via the chamfered protrusion 836. For example, the chamfered protrusion 836 may be configured to be inserted through one or more washers 842 and a coupling nut 844. The coupling nut 844 may be configured to be coupled to an end of the chamfered protrusion 836. For example, the chamfered protrusion 836 may be threaded such that the coupling nut 844 may be coupled to the chamfered protrusion 836.

The one or more washers 842 are configured to distribute a load applied by the coupling nut 844. For example, in one embodiment, the chamfered protrusion 836 is configured to pass through an opening 846 in the mounting block 812, the one or more washers 842, and the coupling nut 844. The one or more washers 842 may distribute the load which would otherwise be applied by the coupling nut 844 in direct contact with the mounting block 812.

In one embodiment, the carriage head 808 is manufactured from 17-4 stainless steel. For example, the carriage head 808 may be manufactured from 17-4 stainless steel using metal injection molding. In some embodiments, the carriage head mount 810 and the mounting block 812 may be manufactured from 1144 steel alloy. For example, 1144 steel alloy may be advantageous due to its high stress-resistance. The carriage head mount 810 and the mounting block 812 may be manufactured using metal injection molding.

In examples discussed above, a laptop computer or other electronic device may be connected to an auxiliary monitor. In other examples, a laptop computer or other electronic device may be connected to more than one auxiliary monitor. For example, laptop computers such as the laptop computer 100 discussed above may be connected to two auxiliary monitors.

Figure 13A:
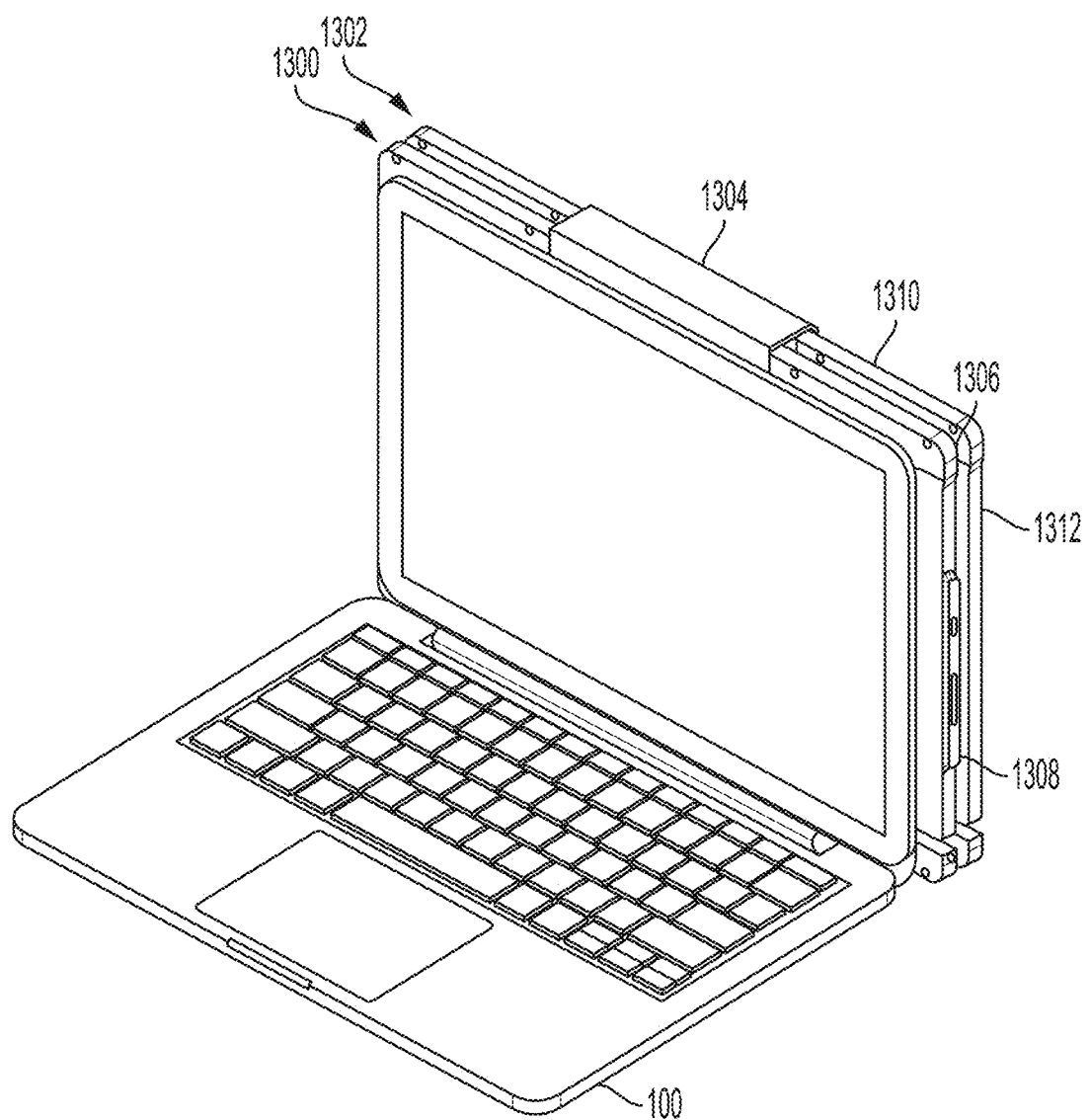
FIG. 13A illustrates a perspective view of an auxiliary display system in a closed position according to an embodiment.
Figure 13B:
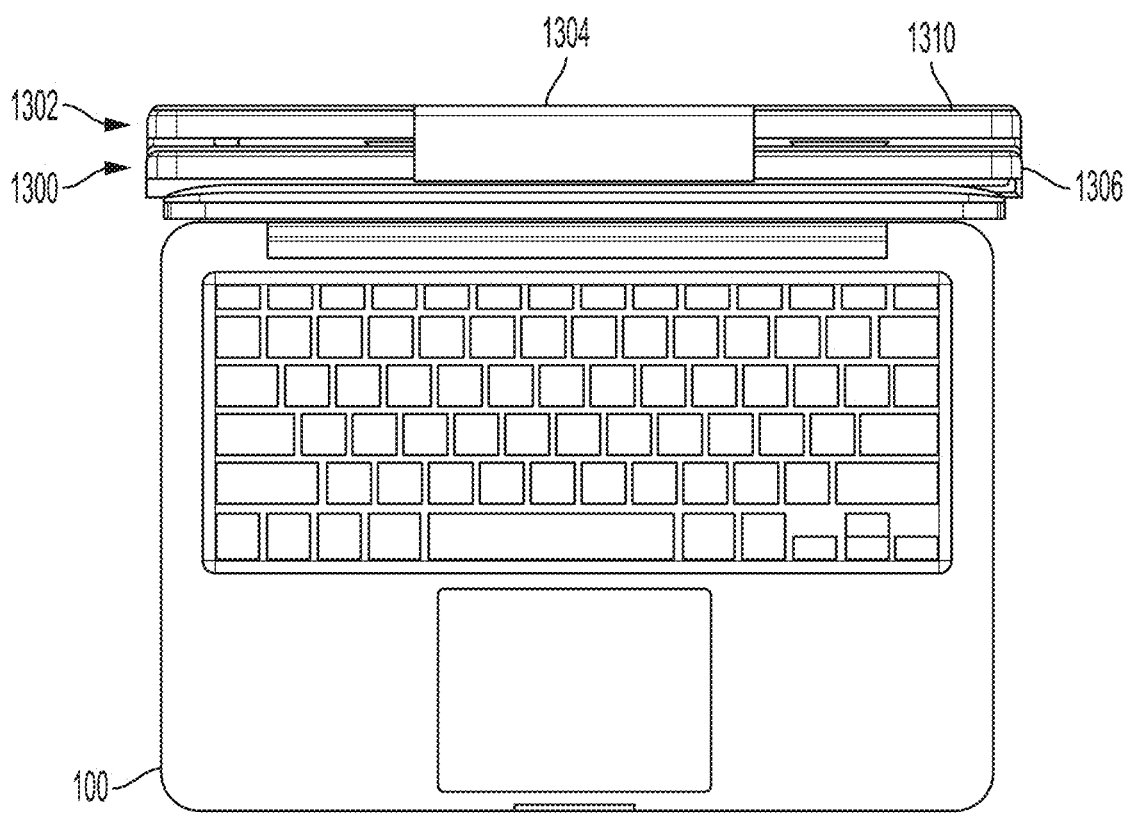
FIG. 13B illustrates a top view of the auxiliary display system in the closed position according to an embodiment.

FIG. 13A illustrates a perspective view of the laptop computer 100 in combination with a first auxiliary monitor 1300 and a second auxiliary monitor 1302 in a closed position. FIG. 13B illustrates a top view of the laptop computer 100 in combination with the first auxiliary monitor 1300 and the second auxiliary monitor 1302 in the closed position. The first auxiliary monitor 1300 is configured to be removably coupled to the second auxiliary monitor 1302 at least in part via a first fastener 1304, also referred to herein as a "clip." As discussed in greater detail below, in some examples the first auxiliary monitor 1300 may be configured to be removably coupled to the second auxiliary monitor 1302 via a second fastener in combination with the first fastener 1304.

The first auxiliary monitor 1300 includes a body 1306 and a display 1308. Similarly, the second auxiliary monitor 1302 includes a body 1310 and a display 1312. In one example, the body 1306 is configured to at least partially encase the display 1308, and the body 1310 is configured to at least partially encase the display 1312. The display 1308 is configured to be slidably connected to the body 1306, such that the display 1308 may slide in and out of the body 1306. Similarly, the display 1312 is configured to be slidably connected to the body 1310, such that the display 1312 may slide in and out of the body 1310.

Figure 14A:
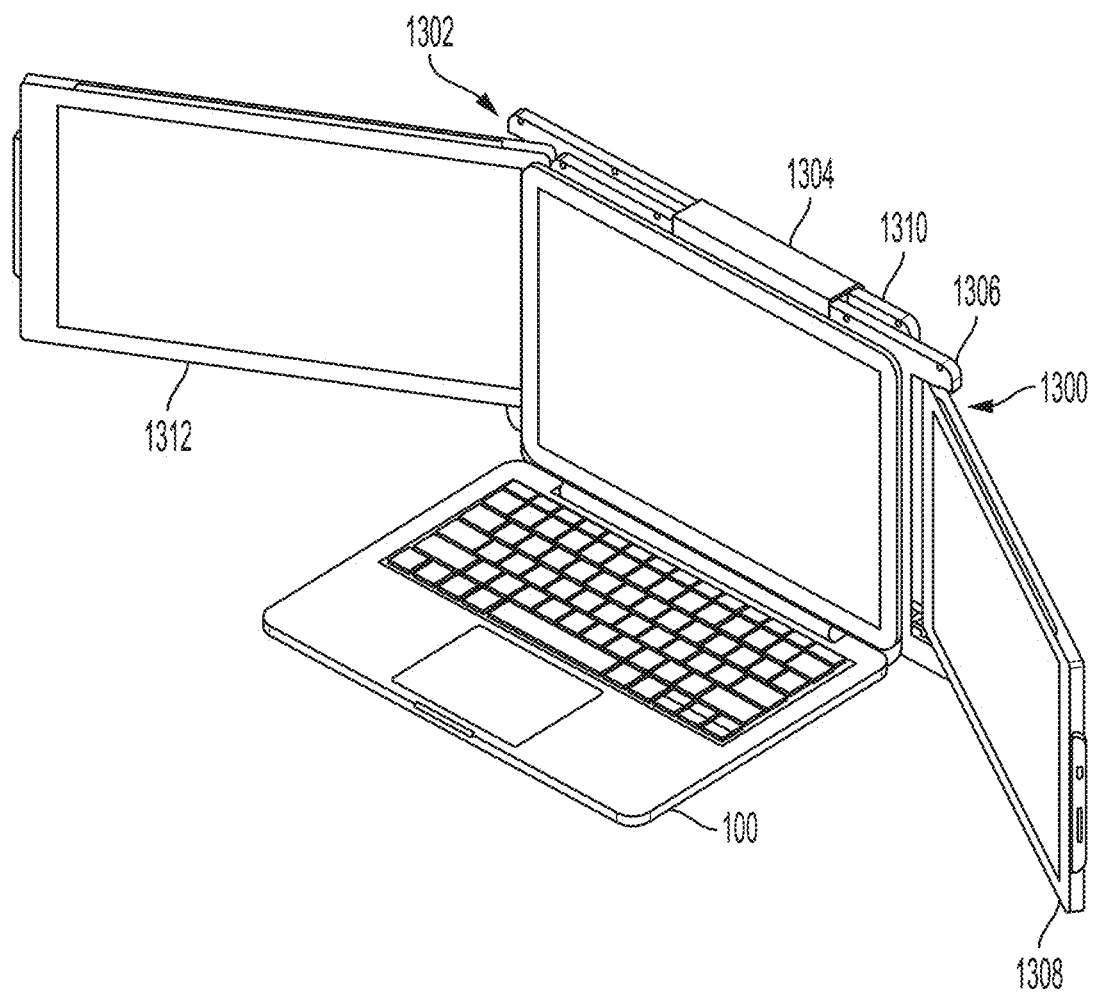
FIG. 14A illustrates a perspective view of the auxiliary display system in an open position according to an embodiment.
Figure 14B:
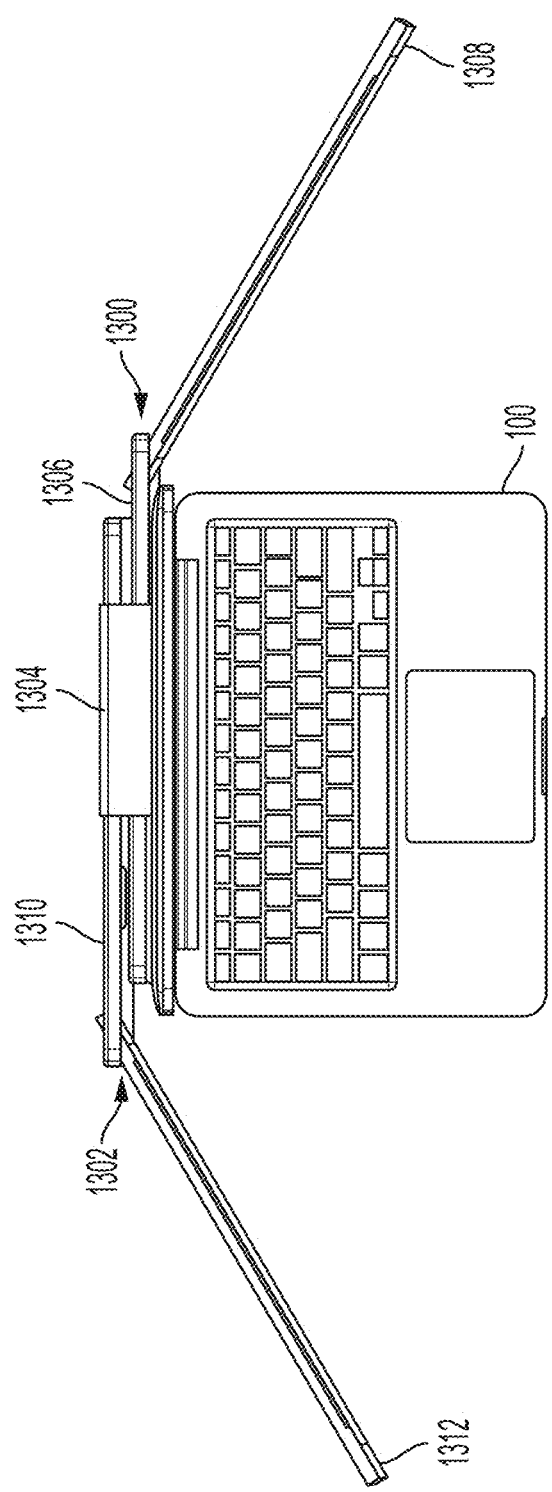
FIG. 14B illustrates a top view of the auxiliary display system in the open position according to an embodiment.

Sliding either or both of the displays 1308, 1312 out of respective bodies 1306, 1310 enables the slid-out displays 1308, 1312 to be rotated about the respective bodies 1306, 1310. For example, FIG. 14A illustrates a perspective view of the laptop computer 100 in combination with the first auxiliary monitor 1300 and the second auxiliary monitor 1302 in an open position. FIG. 14B illustrates a top view of the laptop computer 100 in combination with the first auxiliary monitor 1300 and the second auxiliary monitor 1302 in the closed position.

The displays 1308, 1312 may rotate and slide about the bodies 1306, 1310 in a similar manner as the display portion 108 of the auxiliary monitor 102 about the rails 110*a*, 110*b*. The bodies 1306, 1310 may each respectively include internal grooves (not illustrated) to which the displays 1308, 1312 may be slidably and rotatably coupled. For example, the displays 1308, 1312 may be configured to be coupled to the bodies 1306, 1310 via coupling mechanisms similar to the hinges 132a, 132b, the hinge assembly 806, or another coupling mechanism.

Figure 15:
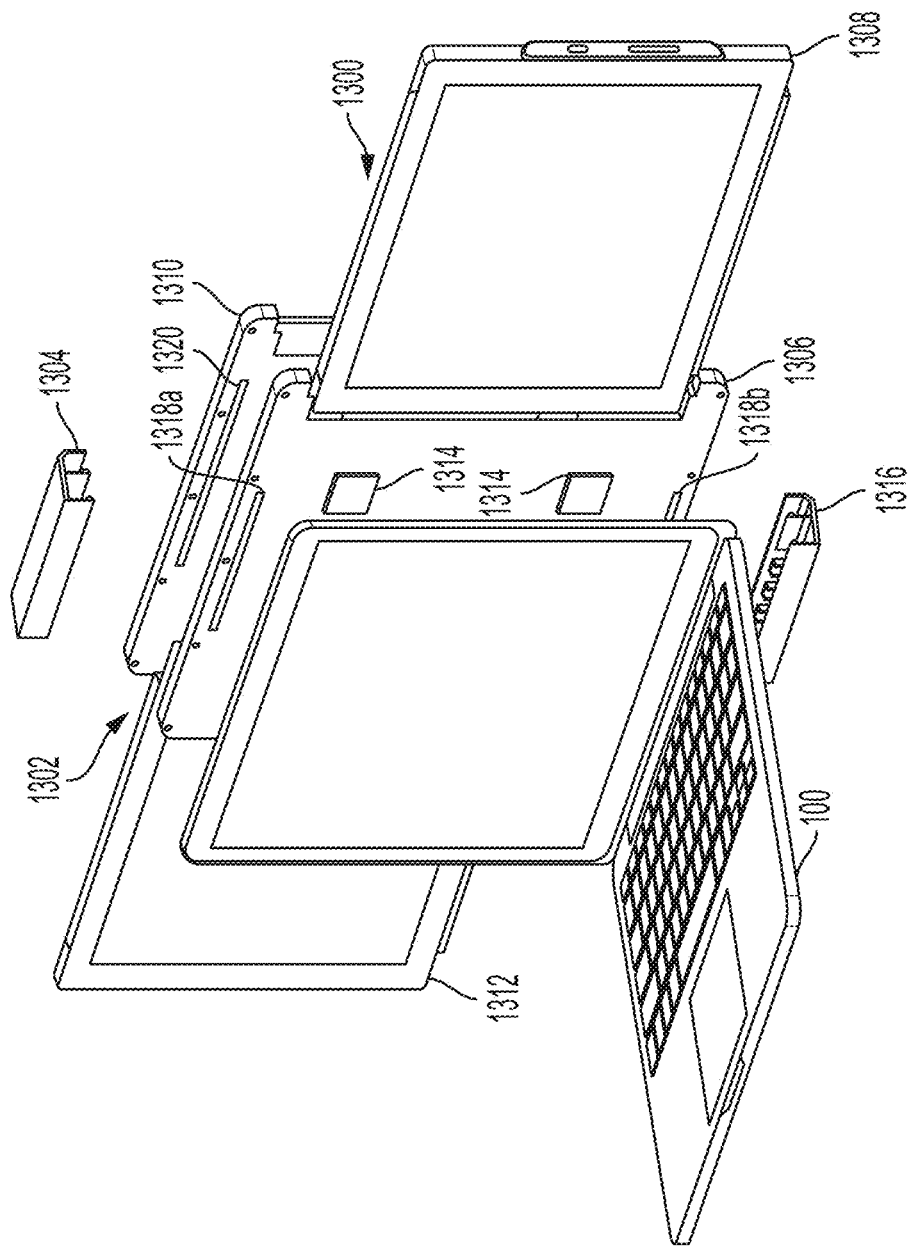
FIG. 15 illustrates an exploded perspective view of the auxiliary display system according to an embodiment.

As discussed above, the first fastener 1304 may enable the first auxiliary monitor 1300 to be removably connected to the second auxiliary monitor 1302. To illustrate the first fastener 1304 in greater detail, FIG. 15 illustrates a perspective exploded view of the first auxiliary monitor 1300 and the second auxiliary monitor 1302. FIG. 15 further illustrates coupling elements 1314, the first fastener 1304, and a second fastener 1316.

The coupling elements 1314 enable the first auxiliary monitor 1300 to be removably coupled to the laptop computer 100. For example, the coupling elements 1314 may be substantially similar to the coupling elements 116. Although only two of the coupling elements 1314 are illustrated, in other examples, the coupling elements 1314 may include more than or fewer than two elements.

The first fastener 1304 and the second fastener 1316 enable the first auxiliary monitor 1300 to be removably connected to the second auxiliary monitor 1302. In one example, the first auxiliary monitor 1300 includes a first groove 1318a and a second groove 1318b, and the second auxiliary monitor 1302 includes a first groove 1320 and a second groove (not illustrated). As discussed in greater detail below with respect to FIGS. 16 and 17, each of the first fastener 1304 and the second fastener 1316 includes at least two ridges configured to couple to the grooves to removably couple the first auxiliary monitor 1300 to the second auxiliary monitor 1302.

FIG. 16A illustrates a perspective view of the first fastener 1304. FIG. 16B illustrates a side view of the first fastener 1304. FIG. 16C illustrates a bottom view of the first fastener 1304. Although FIGS. 16A-16C illustrate aspects of the first fastener 1304, the second fastener 1316 may be substantially similar to the first fastener 1304.

The first fastener 1304 includes a backing 1322 and a first protrusion 1324, a second protrusion 1326, a third protrusion 1328, and spacers 1331, each of which protrudes substantially perpendicularly from the backing 1322. The first protrusion 1324 includes a first ridge 1330, and the second protrusion 1326 includes a second ridge 1332. A first area of space between the first protrusion 1324 and the second protrusion 1326 is sized to receive the first auxiliary monitor 1300, and a second area of space between the second protrusion 1326 and the third protrusion 1328 is sized to receive the second auxiliary monitor 1302.

The ridges 1330, 1332 are configured to couple to grooves. For example, the first ridge 1330 may be configured to couple to the first groove 1318a, and the second ridge 1332 may be configured to couple to the second groove 1320. A portion of the first auxiliary monitor 1300 may be configured to occupy a space between the first protrusion 1324 and the second protrusion 1326 while the first ridge 1330 is coupled to the first grooves 1318a. A portion of the second auxiliary monitor 1302 may be configured to occupy a space between the second protrusion 1326 and the third protrusion 1328 while the second ridge 1332 is coupled to the first groove 1320.

The spacers 1331 may be configured to create a space between the first auxiliary monitor 1300 and the second auxiliary monitor 1302 while the first auxiliary monitor 1300 is coupled to the second auxiliary monitor 1302 (i.e., when the ridges 1330, 1332 are coupled to the grooves 1318a, 1320). In some examples, the spacers 1331 have an approximately C-shaped cross-section, and prevent the first auxiliary monitor 1300 from directly contacting the second auxiliary monitor 1302 while the first auxiliary monitor 1300 is coupled to the second auxiliary monitor 1302. In some examples, the spacers 1331 extend away from the second protrusion 1326 (for example, perpendicularly from a plane along which the second protrusion 1326 runs) to the first protrusion 1324, and are configured to be physically coupled to the first auxiliary monitor 1300. In other examples, the spacers 1331 extend from the second protrusion 1326 to the third protrusion 1328, and are configured to be physically coupled to the second auxiliary monitor 1302.

Figure 17:
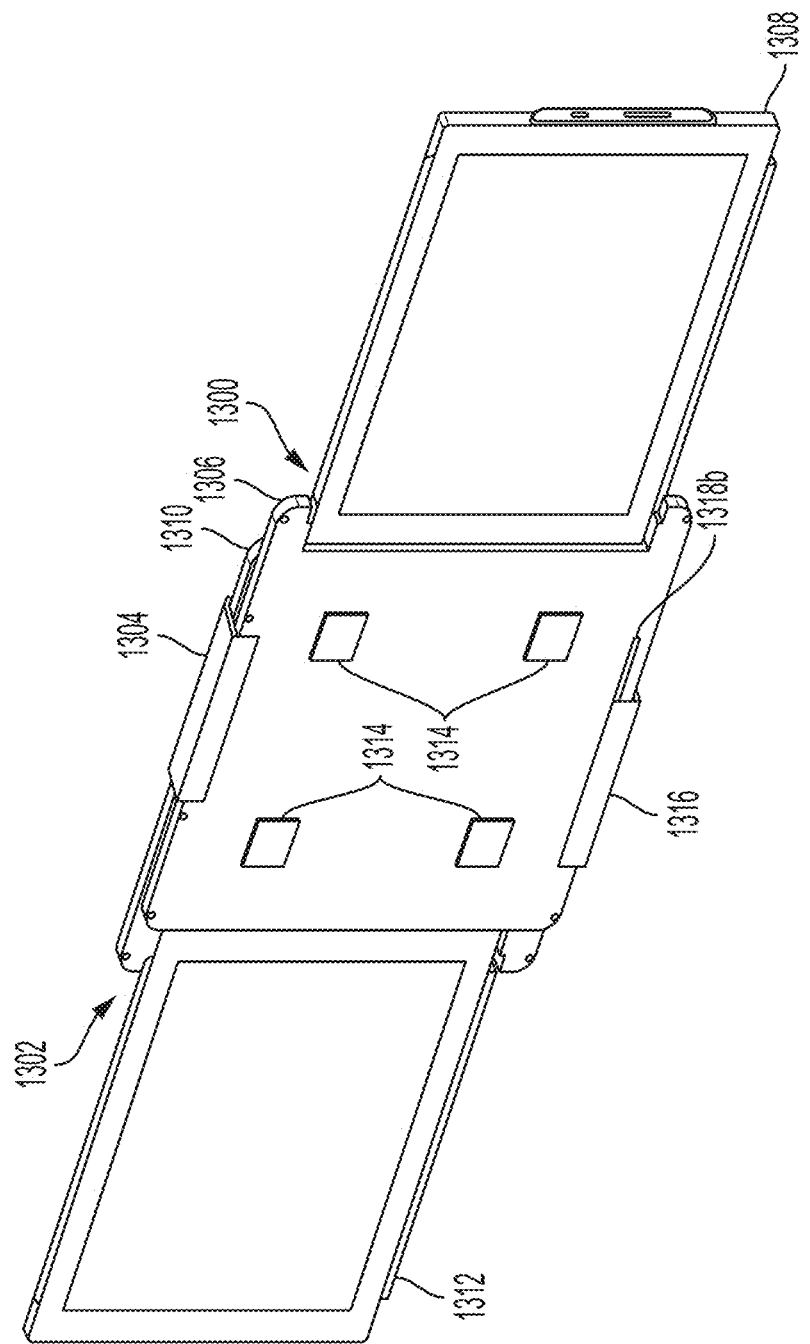
FIG. 17 illustrates a back perspective view of the auxiliary display system according to an embodiment.

FIG. 17 illustrates a back perspective view of the first auxiliary monitor 1300 and the second auxiliary monitor 1302 coupled together via the fasteners 1304, 1316. The ridges 1330, 1332 of the first fastener 1304 are coupled to the grooves 1318a, 1320. Similarly, the second fastener 1316 may be substantially identical to the first fastener 1304 and may include ridges which interface with the second groove 1318b of the first auxiliary monitor 1300 and the second groove of the second auxiliary monitor 1302 in a substantially similar manner as the ridges 1330, 1332 with the grooves 1318a, 1320.

The fasteners 1304, 1316 may be implemented to couple the auxiliary monitors 1300, 1302 together by inserting the auxiliary monitors 1300, 1302 into the fasteners 1304, 1316. For example, a user may insert the first auxiliary monitor 1300 into the first fastener 1304 such that the first ridge 1330 couples with the first groove 1318a and the second ridge 1332 couples with the first groove 1320. Similar principles apply with respect to the second fastener 1316. In some examples, to de-couple the auxiliary monitors 1300, 1302, the user may pull the fasteners 1304, 1316 off of the auxiliary monitors 1300, 1302. For example, the user may pull the first fastener 1304 off of the auxiliary monitors 1300, 1302 such that the ridges 1330, 1332 de-couple from the grooves 1318a, 1320.

In one example, the first groove 1318a and the second groove 1318b are of different lengths. In the illustrated examples, the first groove 1318a is shorter than the second groove 1318b. Similarly, the first groove 1320 of the second auxiliary monitor 1302 is longer than the second groove of the second auxiliary monitor 1302 in the illustrated examples. Thus, as illustrated by FIG. 17, the first groove 1318a is occluded by the first ridge 1330, a length of which is approximately equal to the length of the first groove 1318a. In contrast, only a portion of the second groove 1318b is occluded by the second ridge 1332, because the second ridge 1332—which is approximately equal in length to the first ridge 1330—is not as long as the second groove 1318b.

Varying a length of the grooves enables the first auxiliary monitor 1300 to be offset from the second auxiliary monitor 1302. Offsetting the monitors 1300, 1302, in turn, enables a user to change a direction in which the displays 1308, 1312 slide relative to the laptop 100. For example, in the illustrated examples, the display 1308 is configured to slide to the right from the perspective of a user facing a screen of the laptop 100, and the display 1312 is configured to slide to the left. However, by rotating the first auxiliary monitor 1300 and the second auxiliary monitor 1302 180°, the displays 1308, 1312 are configured to slide in opposite directions. Varying the lengths of the grooves enables such rotation by allowing the monitors 1300, 1302 to be offset, thus preventing the laptop 100 from physically obstructing rotation of the displays 1308, 1312 if the monitors 1300, 1302 are so rotated.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An auxiliary display system, the system comprising:
   a first auxiliary monitor configured to be coupled to a primary monitor, the first auxiliary monitor including a first mount, at least one first rail within the first mount, and a first display portion;
   a second auxiliary monitor including a second mount, at least one second rail within the second mount, and a second display portion; and
   at least one detachable fastener configured to removably couple the first auxiliary monitor to the second auxiliary monitor, wherein the at least one detachable fastener is configured to be capable of being uncoupled from at least one of the first mount or the second mount, and wherein the at least one detachable fastener is configured to maintain the first auxiliary monitor and the second auxiliary monitor in a stacked configuration in which the first display portion is configured to slide along the at least one first rail relative to the first mount and the at least one detachable fastener in a first plane and the second display portion is configured to slide along the at least one second rail relative to the second mount and the at least one detachable fastener in a second plane, the first plane being non-intersecting with the second plane.

2. The auxiliary display system of claim 1, wherein the first display portion includes at least one first hinge configured to be slidably coupled to the at least one first rail and enables the first display portion to rotate relative to the first mount, and wherein the second display portion includes at least one second hinge configured to be slidably coupled to the at least one second rail and enables the second display portion to rotate relative to the second mount.

3. The auxiliary display system of claim 2, wherein the first mount further includes a first groove configured to be removably coupled to the at least one detachable fastener, and wherein the second mount further includes a second groove configured to be removably coupled to the at least one detachable fastener.

4. The auxiliary display system of claim 3, wherein the at least one detachable fastener includes a backing coupled to a first protrusion, a second protrusion, and a third protrusion, and wherein a first space between the first protrusion and the second protrusion receives the first auxiliary monitor and a second space between the second protrusion and the third protrusion receives the second auxiliary monitor.

5. The auxiliary display system of claim 4, wherein the first protrusion includes a first ridge configured to be coupled to the first groove and wherein the second protrusion includes a second ridge configured to be coupled to the second groove.

6. The auxiliary display system of claim 5, wherein the at least one detachable fastener includes at least one spacer coupled to the backing, the at least one spacer being configured to increase a distance between the first auxiliary monitor and the second auxiliary monitor.

7. The auxiliary display system of claim 6, wherein the at least one spacer extends from the second protrusion to one of the first protrusion and the third protrusion, and is configured to be coupled to one of the first auxiliary monitor and the second auxiliary monitor, respectively.

8. The auxiliary display system of claim 3, wherein the first mount further includes a third groove configured to be removably coupled to the at least one detachable fastener, and wherein the second mount further includes a fourth groove configured to be removably coupled to the at least one detachable fastener.

9. The auxiliary display system of claim 8, wherein the at least one detachable fastener includes a first fastener and a second fastener, and wherein:
   the first fastener includes a first backing coupled to a first protrusion, a second protrusion, and a third protrusion, and wherein a first space between the first protrusion and the second protrusion receives the first auxiliary monitor and a second space between the second protrusion and the third protrusion receives the second auxiliary monitor, and
   the second fastener includes a second backing coupled to a fourth protrusion, a fifth protrusion, and a sixth protrusion, and wherein a third space between the fourth protrusion and the fifth protrusion receives the first auxiliary monitor and a fourth space between the fifth protrusion and the sixth protrusion receives the second auxiliary monitor.

10. The auxiliary display system of claim 9, wherein:
    the first protrusion includes a first ridge configured to be coupled to the first groove,
    the second protrusion includes a second ridge configured to be coupled to the second groove,
    the fourth protrusion includes a third ridge configured to be coupled to the third groove, and
    the fifth protrusion includes a fourth ridge configured to be coupled to the fourth groove.

11. The auxiliary display system of claim 10, wherein the third groove is longer than the first groove, and wherein the fourth groove is longer than the second groove.

12. The auxiliary display system of claim 11, wherein a length of the first ridge is equal to a length of the second ridge, a length of the third ridge, and a length of the fourth ridge.

13. The auxiliary display system of claim 12, wherein a length of the third groove is equal to a length of the fourth groove, and wherein a length of the first groove is equal to a length of the second groove.

14. An auxiliary display system, the system comprising:
    a first auxiliary monitor configured to be coupled to a primary monitor, the first auxiliary monitor including a first mount, at least one first rail within the first mount, and a first display portion;
    a second auxiliary monitor including a second mount, at least one second rail within the second mount, and a second display portion; and
    detachable means for removably coupling the first auxiliary monitor to the second auxiliary monitor in a stacked configuration, wherein the detachable means is configured to be capable of being uncoupled from at least one of the first auxiliary monitor or the second auxiliary monitor, and wherein the detachable means enables the second display portion of the second auxiliary monitor to slide within a plane while the second mount of the second auxiliary monitor remains fixed relative to the detachable means.

15. The auxiliary display system of claim 14, further comprising means for coupling the first auxiliary monitor to the second auxiliary monitor in a first configuration, and for reversibly coupling the first auxiliary monitor to the second auxiliary monitor is a second configuration, wherein the first auxiliary monitor and the second auxiliary monitor each have a first orientation in the first configuration and a second orientation in the second configuration, and wherein the first orientation of one of the first auxiliary monitor and the second auxiliary monitor is rotated by 180 degrees from the second orientation of the one of the first auxiliary monitor and the second auxiliary monitor.

16. A detachable fastener comprising:
a backing;
a plurality of protrusions extending from the backing; and
a plurality of ridges each extending from a respective one of the plurality of protrusions and being configured to be detachably coupled to a respective groove of a plurality of grooves each corresponding to a respective mount portion of a respective auxiliary monitor of a plurality of auxiliary monitors to maintain the plurality of auxiliary monitors in a stacked configuration, wherein each ridge of the plurality of ridges is configured to be capable of being uncoupled from at least one groove of the plurality of grooves and to remain fixed relative to each respective mount portion of the plurality of auxiliary monitors while a respective display portion of the plurality of auxiliary monitors slides relative to the at least one groove and the respective mount portion.

17. The fastener of claim 16, wherein the plurality of protrusions includes a first protrusion, a second protrusion, and a third protrusion, and wherein a first space between the first protrusion and the second protrusion is configured to receive a first auxiliary monitor and a second space between the second protrusion and the third protrusion is configured to receive a second auxiliary monitor.

18. The fastener of claim 17, wherein the plurality of ridges includes a first ridge and a second ridge, the first ridge extending from the first protrusion and being configured to be coupled to a first groove of the first auxiliary monitor, and the second ridge extending from the second protrusion and being configured to be coupled to a second groove of the second auxiliary monitor.

19. The fastener of claim 18, further comprising at least one spacer coupled to the backing, the at least one spacer being configured to increase a distance between the first auxiliary monitor and the second auxiliary monitor.

20. The fastener of claim 19, wherein the at least one spacer extends from the second protrusion to one of the first protrusion and the third protrusion, and is configured to be coupled to one of the first auxiliary monitor and the second auxiliary monitor, respectively.

* * * * *